(12) United States Patent
Yamaguchi et al.

(10) Patent No.: US 10,353,153 B2
(45) Date of Patent: Jul. 16, 2019

(54) METHOD OF MANUFACTURING OPTICAL CONNECTOR, OPTICAL CONNECTOR, AND OPTICAL FIBER INSERTION DEVICE

(71) Applicants: FUJIKURA LTD., Tokyo (JP); NIPPON TELEGRAPH AND TELEPHONE CORPORATION, Chiyoda-ku, Tokyo (JP)

(72) Inventors: Takashi Yamaguchi, Sakura (JP); Takaharu Matsuda, Sakura (JP); Hung Huu Luong, Sakura (JP); Kazuhiro Takizawa, Sakura (JP); Keisuke Yoneda, Tsukuba (JP); Kazutoshi Takamizawa, Tsukuba (JP); Yuji Aoyagi, Tsukuba (JP); Katsushi Nakayachi, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/126,137

(22) PCT Filed: Mar. 17, 2015

(86) PCT No.: PCT/JP2015/057930
§ 371 (c)(1),
(2) Date: Sep. 14, 2016

(87) PCT Pub. No.: WO2015/141691
PCT Pub. Date: Sep. 24, 2015

(65) Prior Publication Data
US 2017/0139148 A1    May 18, 2017

(30) Foreign Application Priority Data
Mar. 17, 2014  (JP) .................................. 2014-053583
Mar. 17, 2014  (JP) .................................. 2014-054062

(51) Int. Cl.
*G02B 6/38*    (2006.01)
(52) U.S. Cl.
CPC .......... *G02B 6/382* (2013.01); *G02B 6/3821* (2013.01); *G02B 6/3837* (2013.01);
(Continued)
(58) Field of Classification Search
CPC .................................. G02B 6/38; G02B 6/382
(Continued)

(56) References Cited

U.S. PATENT DOCUMENTS 3,904,269 A * 9/1975 Lebduska .............. G02B 6/382
                                                          385/54
4,691,986 A * 9/1987 Aberson, Jr. .......... G02B 6/382
                                                          385/64
(Continued)

FOREIGN PATENT DOCUMENTS

CN        1996078 A      7/2007
CN       101034192 A     9/2007
(Continued)

OTHER PUBLICATIONS

Office Action in corresponding Australian Patent Application No. 2015232529 dated Feb. 20, 2017 (2 pages).
(Continued)

*Primary Examiner* — Kaveh C Kianni
(74) *Attorney, Agent, or Firm* — Osha Liang LLP

(57) ABSTRACT

A method of manufacturing an optical connector according to the invention includes: holding a first optical fiber by a pair of holding members at a position apart from an end face of a second end and through both sides thereof in a radial direction, the first optical fiber being provided with a solid refractive index-matching material layer, the refractive index-matching material layer being formed on the end face of the second end on an opposite side of an end face of a first
(Continued)

end exposed to a front end of a ferrule; and inserting the first optical fiber into a fiber hole of the ferrule through the first end.

16 Claims, 27 Drawing Sheets

(52) U.S. Cl.
CPC ......... *G02B 6/3838* (2013.01); *G02B 6/3846* (2013.01); *G02B 6/3861* (2013.01); *G02B 6/3881* (2013.01); *G02B 6/3893* (2013.01); *G02B 6/3806* (2013.01)

(58) Field of Classification Search
USPC .......................................................... 385/72
See application file for complete search history.

(56) References Cited

U.S. PATENT DOCUMENTS

| | | | | |
|---|---|---|---|---|
| 5,048,915 | A * | 9/1991 | Coutts | G02B 6/3861 385/86 |
| 5,235,664 | A * | 8/1993 | Okada | G02B 6/3837 385/134 |
| 5,412,748 | A * | 5/1995 | Furuyama | G02B 6/3839 257/98 |
| 5,467,419 | A * | 11/1995 | Roff | G02B 6/32 385/92 |
| 5,953,477 | A * | 9/1999 | Wach | A61B 5/14546 385/115 |
| 6,074,577 | A | 6/2000 | Katsura et al. | |
| 6,087,194 | A * | 7/2000 | Matsukura | H01L 31/0203 257/E31.117 |
| 6,123,463 | A * | 9/2000 | Kashihara | G02B 6/3821 385/59 |
| 6,409,394 | B1 * | 6/2002 | Ueda | G02B 6/25 385/80 |
| 6,908,779 | B2 * | 6/2005 | Ogawa | G02B 6/423 438/27 |
| 7,412,145 | B2 * | 8/2008 | Honma | G02B 6/3802 385/134 |
| 7,440,657 | B2 | 10/2008 | Furue et al. | |
| 2002/0118928 | A1 * | 8/2002 | Roehrs | G02B 6/3807 385/84 |
| 2004/0223703 | A1 * | 11/2004 | Miyamae | G02B 6/4228 385/88 |
| 2005/0063651 | A1 * | 3/2005 | Hamasaki | G02B 6/4249 385/100 |
| 2006/0147158 | A1 * | 7/2006 | Sato | G02B 6/4204 385/78 |
| 2007/0086707 | A1 * | 4/2007 | Suzuki | G02B 6/255 385/58 |
| 2007/0160328 | A1 * | 7/2007 | Furue | G02B 6/3616 385/77 |
| 2007/0211997 | A1 * | 9/2007 | Saito | G02B 6/3846 385/60 |
| 2008/0013891 | A1 * | 1/2008 | Nishioka | G02B 6/3809 385/59 |
| 2008/0159696 | A1 * | 7/2008 | Suzuki | G02B 6/3846 385/72 |
| 2008/0304794 | A1 * | 12/2008 | Kato | G02B 6/3846 385/80 |
| 2010/0098381 | A1 * | 4/2010 | Larson | G02B 6/3846 385/60 |
| 2011/0079930 | A1 * | 4/2011 | Saito | G02B 6/3846 264/1.25 |
| 2014/0254990 | A1 * | 9/2014 | Hiyama | G02B 6/3853 385/84 |
| 2016/0077286 | A1 * | 3/2016 | Yamaguchi | G02B 6/262 385/98 |

FOREIGN PATENT DOCUMENTS

| | | |
|---|---|---|
| CN | 102057307 A | 5/2011 |
| JP | 59-67508 A | 4/1984 |
| JP | 2007-183383 A | 7/2007 |
| JP | 2011-33731 A | 2/2011 |
| JP | 2011-39237 A | 2/2011 |
| JP | 2012-226252 A | 11/2012 |
| JP | 2014-211608 A | 11/2014 |

OTHER PUBLICATIONS

Office Action in counterpart Chinese Patent Application No. 201580013871.X dated on Apr. 19, 2017 (6 pages).
Japanese Industrial Standards, "F04 Type Connectors for Optical Fiber Cables (Type SC Connectors)", JIS C 5973, 2014, pp. 1-3 and 24.
Japanese Industrial Standard, "Rubber, vulcanized or thermoplastic—Determination of hardness—Part 3: Durometer method", JIS K 6253-3, 2012, 19 pages.
Surface Roughness (JIS B 0601-2001), 2001, 1 page.
M. Sato, et al., "Mechanical Strength and Reliability of Optical Fiber", Fujikura Giho, Mar. 1983, pp. 1- 8, vol. 65.
JPO Office Action for Application No. 2014-053583 dated Jan. 19, 2016.
JPO Office Action for Application No. 2014-054062 dated Jan. 19, 2016.
JPO Notice of Allowance for Application No. 2014-053583 dated Mar. 22, 2016.
JPO Notice of Allowance for Application No. 2014-054062 dated Mar. 22, 2016.
Communication dated Dec. 1, 2016 from the Taiwanese Intellectual Property Office in counterpart Application No. 104108468.
Office Action in corresponding Australian Patent Application No. 2015232529 dated Jun. 8, 2017 (3 pages).
Office Action issued in corresponding Russian Application No. 2016140033 dated Jan. 22, 2018 (9 pages).
Extended European Search Report issued in corresponding European Application No. 15764084.8 dated Jan. 24, 2018 (13 pages).
Office Action in corresponding Canadian Patent Application No. 2,942,644 dated Jul. 19, 2017 (4 pages).
Office Action issued in corresponding Canadian Application No. 2,942,644 dated Apr. 26, 2018 (4 pages).
Notice of Allowance issued in corresponding Russian Application No. 2016140033 dated May 7, 2018 (12 pages).
Office Action issued in corresponding Chinese Application No. 201580013871.X dated Mar. 9, 2018 (4 pages).
Partial Supplementary European Search Report in counterpart European Application No. 15 76 4084.8 dated Sep. 29, 2017 (14 pages).
Office Action in corresponding Vietnamese Patent Application No. 1-2016-03849 dated Nov. 30, 2018, with translation (4 pages).
Office Action in corresponding Canadian Patent Application No. 2,942,644 dated Mar. 21, 2019 (5 pages).

* cited by examiner

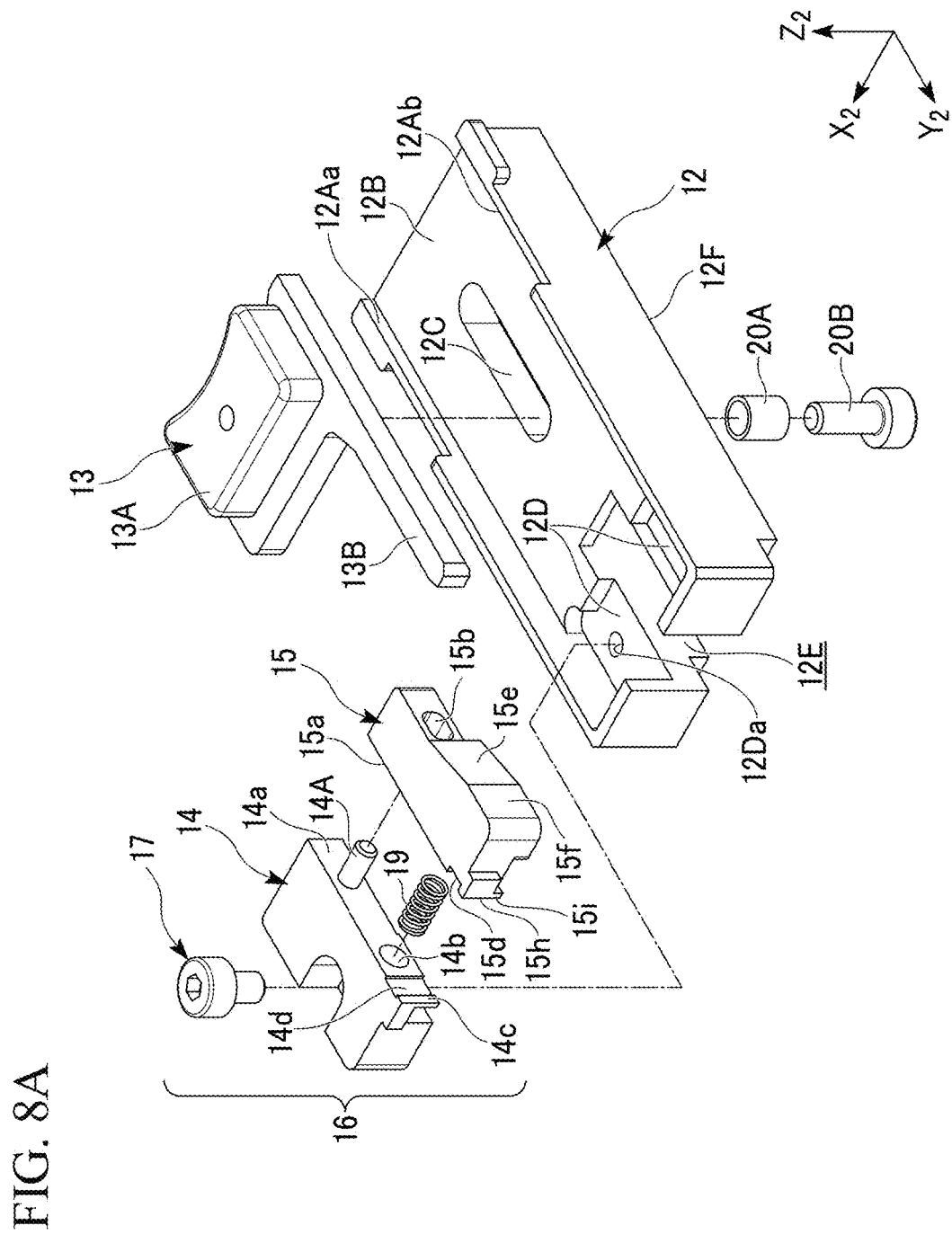

METHOD OF MANUFACTURING OPTICAL CONNECTOR, OPTICAL CONNECTOR, AND OPTICAL FIBER INSERTION DEVICE

CROSS REFERENCE TO RELATED APPLICATIONS

This application is a National Stage of International Application No. PCT/JP2015/057930, filed on Mar. 17, 2015, which claims priority from Japanese Patent Application No. 2014-053583, filed on Mar. 17, 2014, and Japanese Patent Application No. 2014-054062, filed on Mar. 17, 2014 the contents of all of which are incorporated herein by reference in their entirety.

TECHNICAL FIELD

The present invention relates to a method of manufacturing an optical connector, an optical connector, and an optical fiber insertion device.

This application claims priority from Japanese Patent Application No. 2014-053583 filed on Mar. 17, 2014, and Japanese Patent Application No. 2014-054062 filed on Mar. 17, 2014, the contents of which are incorporated herein by reference in their entirety.

BACKGROUND ART

An example of an optical connector (so-called field assembly-type optical connector, or optical fiber connector) or the like capable of performing assembly work of optical fibers in a connection field includes a connector having a built-in optical fiber inserted and fixed to a ferrule in advance.

In this kind of optical connector (optical fiber connector), the end of another optical fiber (external optical fiber, inserted optical fiber) is butt-jointed to the end of a receiving-side optical fiber (built-in optical fiber) by a connection mechanism (for example, clamp) provided on the rear end side of the ferrule, and thus these optical fibers are connected to each other. A portion (connection portion) in which the end of the built-in optical fiber and the end of the inserted optical fiber are butt-connected to each other is held and fixed by the connection mechanism, and the state of connection between the optical fibers is maintained.

In order to achieve a reduction in connection loss, a liquid refractive index-matching material such as a solid refractive index-matching material or silicone-based grease can be used in a butt-connection portion between the built-in optical fiber and the inserted optical fiber (see, for example, Patent Document 1).

When the optical fibers are connected to each other using an optical fiber connector, the inserted optical fiber is required to be cut in order to adjust the lengths of the optical fibers depending on the specification of the optical fiber connector.

When the optical fiber is cut off, an initial crack is formed in the optical fiber by a cutting tool (optical fiber cutter), and then a force is given to the optical fiber so as to grow the initial crack, to thereby obtain a specular cutting face.

An example of the optical fiber cutter may include an exclusive optical fiber cutter capable of high-accuracy cutting. However, since the exclusive optical fiber cutter is high in price, a low-cost and simple-type optical fiber cutter (for example, a cutter that manually operates a cutting blade) may be used.

PRIOR ART DOCUMENTS

Patent Documents

[Patent Document 1] Japanese Unexamined Patent Application, First Publication No. 2011-33731

SUMMARY OF INVENTION

Problems to be Solved by the Invention

A built-in optical fiber having a solid refractive index-matching material formed on an end face is built-in and fixed to a fiber hole formed in a ferrule. Therefore, in the manufacturing of the optical connector, the built-in optical fiber is held and is inserted into the fiber hole. In this insertion step, there may be a concern of the solid refractive index-matching material being damaged. When a connection mechanism is configured using the damaged solid refractive index-matching material, a connection loss of the optical fiber may increase.

In the simple-type optical fiber cutter, since it is difficult to keep the conditions of cutting of the optical fiber completely constant, an entirely specular front end face may not be obtained. For example, micro irregularities such as hackle marks, or a protruding portion protruding considerably may be formed on a front end face. In this case, a connection loss may increase due to the irregularities or the like of the front end face.

In a case where a liquid refractive index-matching material (such as silicone grease) is used in a connection portion between the built-in optical fiber and the inserted optical fiber, it is possible to reduce the influence of irregularities or the like between end faces, and to reduce a connection loss.

However, in a case where the liquid refractive index-matching material is used, air bubbles or foreign substances mixed into the liquid refractive index-matching material may have an adverse influence on a connection loss. For example, at the beginning of connection, a connection loss is low, but the flowability of the liquid refractive index-matching material increases under a high-temperature environment. Thereby, air bubbles or foreign substances enter the air gap in association with a flow of the liquid refractive index-matching material, and thus a loss may increase.

The invention was conceived in view of such circumstances, and an object thereof is to provide a method of manufacturing an optical connector which includes inserting an optical fiber into a fiber hole of a ferrule without damaging a solid refractive index-matching material, an optical connector, and an optical fiber insertion device.

In addition, another object of the invention is to provide a method of connecting optical fibers capable of optically connecting the optical fibers at a low loss, even in a case where irregularities are present in a front end face of an external optical fiber when the external optical fiber is butt-connected to a receiving-side optical fiber using an optical fiber connector.

Means for Solving the Problems

A method of manufacturing an optical connector according to a first aspect of the invention, includes: holding a first optical fiber by a pair of holding members at a position apart from an end face of a second end and through both sides thereof in a radial direction, the first optical fiber being provided with a solid refractive index-matching material layer, the refractive index-matching material layer being formed on the end face of the second end on an opposite side of an end face of a first end exposed to a front end of a ferrule; and inserting the first optical fiber into a fiber hole of the ferrule through the first end.

The method of manufacturing an optical connector according to the first aspect of the invention may further include sliding an optical fiber holder that includes the pair of holding members and holds the first optical fiber by a slider toward the fiber hole of the ferrule in a direction inclined from an axial direction of the fiber hole of the ferrule, and thereby inserting the first optical fiber into the fiber hole.

In the method of manufacturing an optical connector according to the first aspect of the invention, the first optical fiber may be held by the pair of holding members from a direction orthogonal to a plane which is formed by a direction in which the optical fiber holder slides by the slider and the axial direction of the fiber hole.

In the method of manufacturing an optical connector according to the first aspect of the invention, a connection mechanism that holds a connection portion butt-jointing the first optical fiber protruding from a rear of the ferrule and a second optical fiber may be provided at a rear side of the ferrule, the connection mechanism may include: a base member extending from the ferrule to the rear; and a lid member that interposes the connection portion between the base member and the lid member, an alignment groove that is used to align the first optical fiber and the second optical fiber may be formed in the base member, when the first optical fiber is inserted into the fiber hole, the first optical fiber may be held by the optical fiber holder so as to be inclined in the axial direction of the fiber hole, and when the first optical fiber moves forward, the first optical fiber may be introduced into an inlet portion of the fiber hole by being curved by bringing the first optical fiber into contact with the alignment groove.

In the method of manufacturing an optical connector according to the first aspect of the invention, the slider may include a forward-movement limiter that determines a forward-movement limit of the optical fiber holder, and the second end of the first optical fiber may be positioned in the alignment groove by releasing the holding of the optical fiber holder at the forward-movement limit determined by the forward-movement limiter.

The method of manufacturing an optical connector according to the first aspect of the invention may further include: filling the fiber hole with an adhesive in advance; inserting the first optical fiber into the fiber hole, thereby forming, on the front end of the ferrule, a swelling portion at which an adhesive overflows from the fiber hole; and determining a length of the first optical fiber so that the first end is contained in the swelling portion.

In the method of manufacturing an optical connector according to the first aspect of the invention, the optical fiber holder may include a first holding surface and a second holding surface which interpose and hold the first optical fiber, and on each of the first holding surface and the second holding surface, a recessed portion may be formed that constitutes a protective space having the end face of the second end of the first optical fiber which are received therein.

In the method of manufacturing an optical connector according to the first aspect of the invention, the first optical fiber of which the refractive index-matching material layer has a thickness larger than 10 μm may be butt-connected to the second optical fiber falling under any of the following conditions with the refractive index-matching material layer interposed therebetween:

(1) a protrusion height of a protruding portion protruding from a reference surface toward the first optical fiber is less than 10 μm, and the core is included in a non-mirror portion, where the reference surface is a face that includes a core and is parallel to an end face of a connection end of the first optical fiber; and (2) the protrusion height of the protruding portion is equal to or greater than 10 μm and equal to or less than a thickness of the refractive index-matching material layer.

In the method of manufacturing an optical connector according to the first aspect of the invention, an end face of a connection end of the second optical fiber may be cut off by a simplified optical fiber cutter that manually performs driving of a cutting blade or application of a tensile force to the second optical fiber.

In the method of manufacturing an optical connector according to the first aspect of the invention, an end face of a core of the second optical fiber which is the non-mirror face may have hackle marks formed on at least a portion thereof.

In the method of manufacturing an optical connector according to the first aspect of the invention, a Shore hardness E and a thickness of the refractive index-matching material layer may be in a range surrounded by (Shore hardness E; 30, thickness; 20 μm), (Shore hardness E; 85, thickness; 20 μm), (Shore hardness E; 85, thickness; 40 μm), and (Shore hardness E: 30, thickness: 60 μm).

In the method of manufacturing an optical connector according to the first aspect of the invention, a holey fiber may be used as the first optical fiber, and the Shore hardness E of the refractive index-matching material layer may be in a range of equal to or greater than 45 and equal to or less than 80.

In the method of manufacturing an optical connector according to the first aspect of the invention, the refractive index-matching material layer may be formed in a curved-convex shape.

An optical connector according to a second aspect of the invention, manufactured by the manufacturing method according to the first aspect of the invention, the refractive index-matching material layer is bonded to the entire end face of the second end of the first optical fiber.

An optical fiber insertion device according to a third aspect of the invention, which inserts a first optical fiber into a fiber hole of a ferrule, the first optical fiber being built-in and fixed thereto, the first optical fiber having a first end exposed to a front end of the ferrule and having a solid refractive index-matching material layer formed on an end face of a second end. The device includes: a ferrule holder that holds the ferrule; an optical fiber holder that holds the second end of the first optical fiber at a position apart from the end face and through both sides thereof in a radial direction, and includes a pair of holding members of which at least one is opened and closed; and a slider that slides the optical fiber holder toward the fiber hole of the ferrule in a direction inclined from an axial direction of the fiber hole of the ferrule, wherein the optical fiber holder slides by the slider toward the fiber hole of the ferrule, and the first optical fiber is inserted into the fiber hole through the first end.

In the optical fiber insertion device according to the third aspect of the invention, on each of a first holding surface and a second holding surface which are respective holding surfaces of the pair of holding members, a recessed portion may be formed that constitutes a protective space having the end face of the second end of the first optical fiber which are received therein.

In the optical fiber insertion device according to the third aspect of the invention, the slider may include a forward-movement limiter that determines a forward-movement limit of the optical fiber holder, and the second end of the first optical fiber may be positioned by releasing the holding of the optical fiber holder at the forward-movement limit determined by the forward-movement limiter.

EFFECTS OF THE INVENTION

According to the aforementioned aspects of the invention, since the first optical fiber is held at a position apart from the end face of the second end and through both sides thereof in a radial direction and is inserted into the fiber hole, the first optical fiber does not contact the refractive index-matching material layer formed on the end face. Therefore, it is possible to insert the first optical fiber into the fiber hole of the ferrule without damaging the solid refractive index-matching material.

According to the aforementioned aspect of the invention, it is possible to interpose the refractive index-matching material layer between the end faces of the first optical fiber and the second optical fiber (particularly, between the end faces of the cores). Therefore, even in a case where irregularities are present on the end face of the second optical fiber, a void does not occur between the end faces (particularly, between the end faces of the cores), and thus it is possible to realize low-loss optical connection.

In addition, since the refractive index-matching material layer is solid, unlike a case where a liquid refractive index-matching material is used, a disadvantage does not occur in which a loss increases after the connection of the optical fiber due to the infiltration of air bubbles or foreign substances associated with a flow of the refractive index-matching material under the high-temperature environment.

In addition, since a loss can be suppressed even in a case where irregularities are present on the end face of the second optical fiber, it is possible to use a low-cost and simple-type optical fiber cutter, which is advantageous in terms of cost.

BRIEF DESCRIPTION OF THE DRAWINGS

FIG. 8A is an exploded perspective view showing an exploded view showing the optical fiber holder shown in FIGS. 7A and 7B.

EMBODIMENTS FOR CARRYING OUT THE INVENTION

Figure 1:
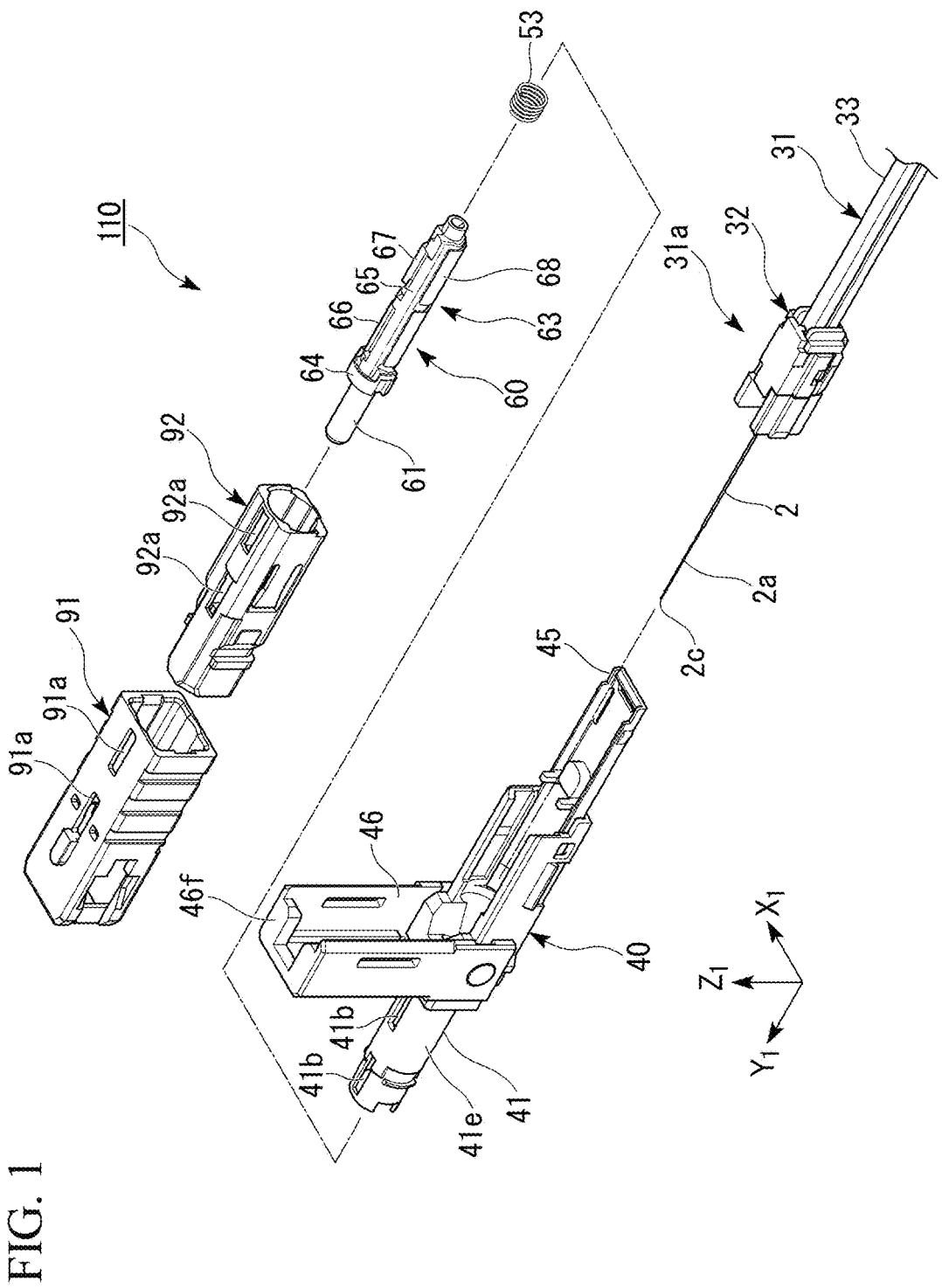
FIG. 1 is an exploded perspective view showing an optical connector according to a first embodiment of the invention.

Hereinafter, the invention will be described with reference to the accompanying drawings on the basis of preferred embodiments.

In each drawing used in the following description, the reduced scale of each member is appropriately changed in order to be set to a size capable of perceiving each member.

The present embodiments are specifically described in order to better understand the gist of the invention, although the invention is not limited thereto, except as otherwise noted.

(First Embodiment)

Hereinafter, a method of manufacturing an optical connector of the invention and a device which is used in the manufacturing method will be described with reference to each drawing.

Each drawing depicts an $X_1$-$Y_1$-$Z_1$ coordinate system, an $X_2$-$Y_2$-$Z_2$ coordinate system, and an $X_3$-$Y_3$-$Z_3$ coordinate system. In the present specification, each direction is set along these coordinate systems, and the description thereof will be given.

In the drawings used in the following description, the featuring portions of the invention may be enlarged, for convenience, in order to make the features thereof easier to understand, and the dimension ratios and the like for each of the components are not necessarily the same as those in reality.

(Optical Connector)

FIG. 1 is an exploded view showing the optical connector to which the invention is applied. In FIG. 1, the longitudinal direction of an optical fiber cable 31 is set to a $Y_1$-axis direction, and the front end side thereof is set to a $+Y_1$ direction.

This optical connector is a field assembly-type optical connector, and is assembled to the terminal of the optical fiber cable 31. This optical connector is, for example, an SC-type optical connector (F04-type optical connector specified by JIS C5973).

In the following description, the direction ($+Y_1$ direction in FIG. 1) of the terminal side of the optical fiber cable 31 to be connected may be referred to as a front, and the opposite direction ($-Y_1$ direction) thereof may be referred to as a rear.

An optical connector (exploded optical connector 110) shown as an exploded view in FIG. 1 includes a sleeve-shaped knob 91, a plug frame 92 attached into the knob 91, a ferrule 60 with a clamp attached into the plug frame 92, a rear-side housing 40 attached to the plug frame 92, and a spring 53 that elastically biases the ferrule 60 with a clamp to the front. A cable terminal 31a with a fixed member is inserted and assembled into the rear portion of this optical connector. This cable terminal 31a with a fixed member is constituted by a terminal of the optical fiber cable 31 and an anchoring fixed member 32 fixed to the terminal.

The optical fiber cable 31 is configured such that, for example, a second optical fiber 2 (inserted optical fiber 2) and a linear tensile strength member (not shown) having flexibility are collectively coated by an external coating 33 made of a synthetic resin so as to be in parallel to each other. The second optical fiber 2 is, for example, an optical fiber with a coating having a configuration in which the outer circumferential face (lateral face) of a bare optical fiber 2a is covered with a coat, and can exemplify an optical fiber core, an optical fiber strand or the like.

The second optical fiber 2 is not particularly limited to the configuration thereof, and may be a single-mode optical fiber or a holey fiber. The holey fiber is an optical fiber having a plurality of continuous holes in a waveguide direction. The holey fiber is adopted, and thus the light-trapping effect of the optical fiber is enhanced by the hole, thereby allowing a bending loss to be reduced.

Figure 2:
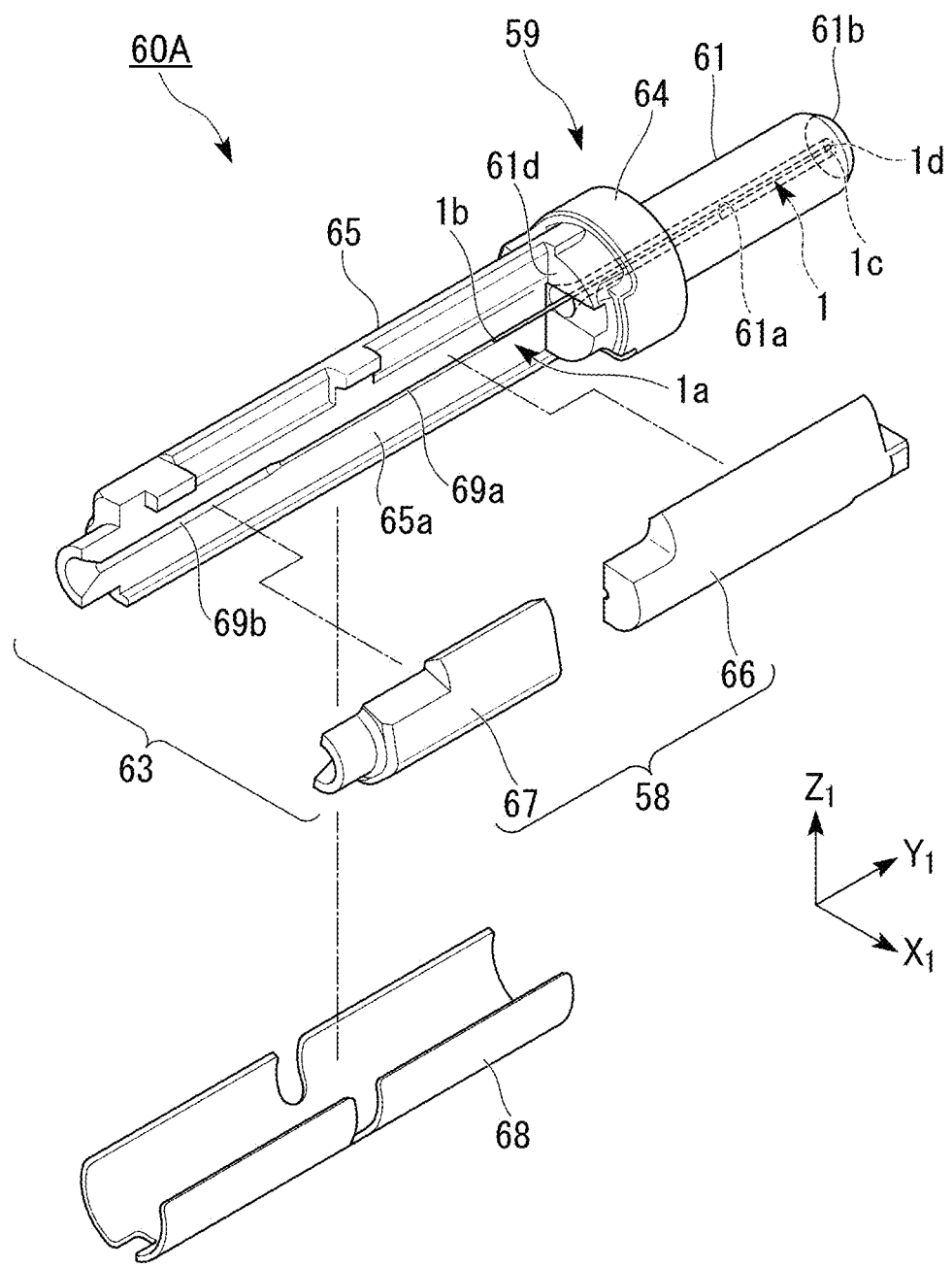
FIG. 2 is an exploded perspective view showing a ferrule with a clamp which is a component of the optical connector of FIG. 1.

FIG. 2 shows an exploded ferrule 60A with a clamp obtained by exploding the ferrule 60 with a clamp. The ferrule 60 with a clamp includes a ferrule structure 59, a second interposition element 58 constituted by lid members 66 and 67, and a clamp spring 68.

The ferrule structure 59 is constituted by a ferrule 61 and a base member 65 (first interposition element 65) which is fixed to the ferrule 61. The base member 65 including a flange 64 is disposed at the rear portion of the ferrule 61. The base member 65 is formed so as to extend from the flange 64 to the rear side ($-Y_1$ direction). In addition, the ferrule 61 is provided with a fiber hole 61a, and a first optical fiber 1 (built-in optical fiber 1) is built-in and fixed to this fiber hole 61a.

The first optical fiber 1 is, for example, a bare optical fiber, and has the same configuration as that of the bare optical fiber 2a of the second optical fiber 2. The first optical fiber 1 is inserted into the fiber hole 61a which is a fine hole formed in the ferrule 61 concentrically with the axis line of the ferrule, and is fixed to the ferrule 61 by adhesive fixation or the like using an adhesive. In FIG. 2, the fiber hole 61a is shown larger than the actual dimensions.

The first optical fiber 1 is polished after the insertion thereof so that an end face 1d (front end face 1d) of a first end 1c on the front (+$Y_1$ side) is coincident with a front end face 61b (front end 61b) of the ferrule 61.

A manufacturing step of inserting the first optical fiber 1 into the fiber hole 61a will be described later in detail with reference to FIG. 10 or the like.

The base member 65 extending from the flange 64 to the rear is fixed to the ferrule 61. An opposite face 65a (groove formation face) facing the lid members 66 and 67 is formed in this base member 65. An alignment groove 69a that is used to position a second end 1a which is a rear side end of the first optical fiber 1 on the rearward extension of the fiber hole 61a of the ferrule 61, and a coated portion receiving groove 69b extending rearward from the rear end of the alignment groove 69a are formed on the opposite face 65a.

Figure 6:
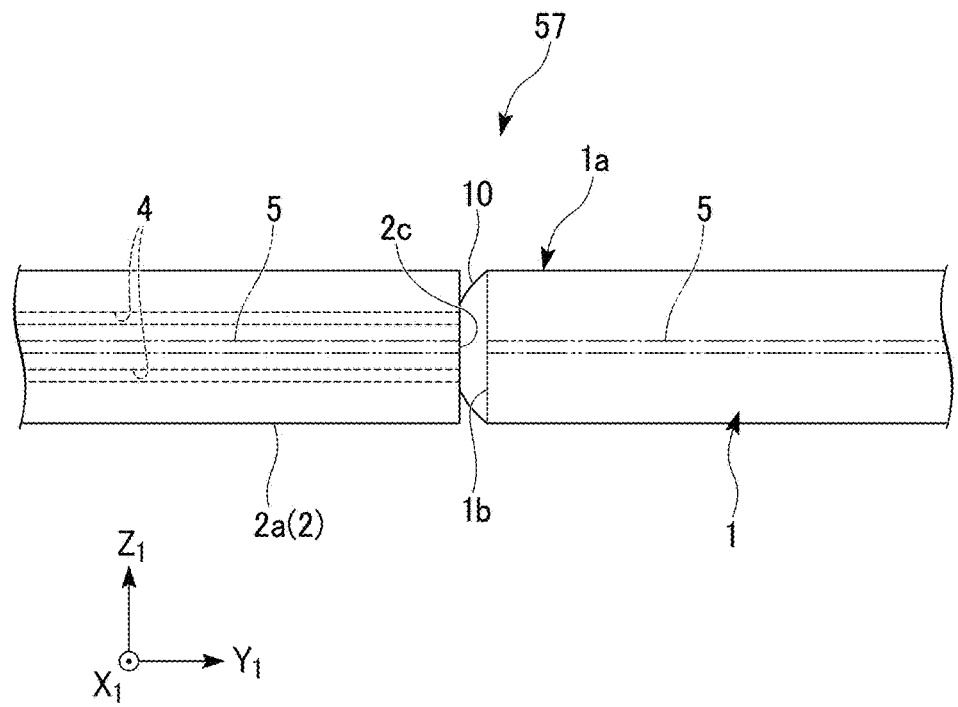
FIG. 6 is a diagram showing a connection portion between the first optical fiber in the ferrule with a clamp of FIG. 2 and a second optical fiber.

The first optical fiber 1 is disposed in the alignment groove 69a, and a front end face 2c of the second optical fiber 2 is butt-jointed to the rear end face 1b (end face on the −$Y_1$ side) to form a connection portion 57 (see FIG. 6).

The lid members 66 and 67 facing the opposite face 65a of the base member 65 (first interposition element 65) form a pair to constitute the second interposition element 58. In addition, a clamp 63 is constituted by the second interposition element 58 and the base member 65, and the clamp spring 68 that collectively holds these components in the inside.

The clamp 63 can hold and fix the connection portion 57 between the first optical fiber 1 and the second optical fiber 2 with the connection portion interposed between the base member 65 and the lid members 66 and 67.

Figure 3:
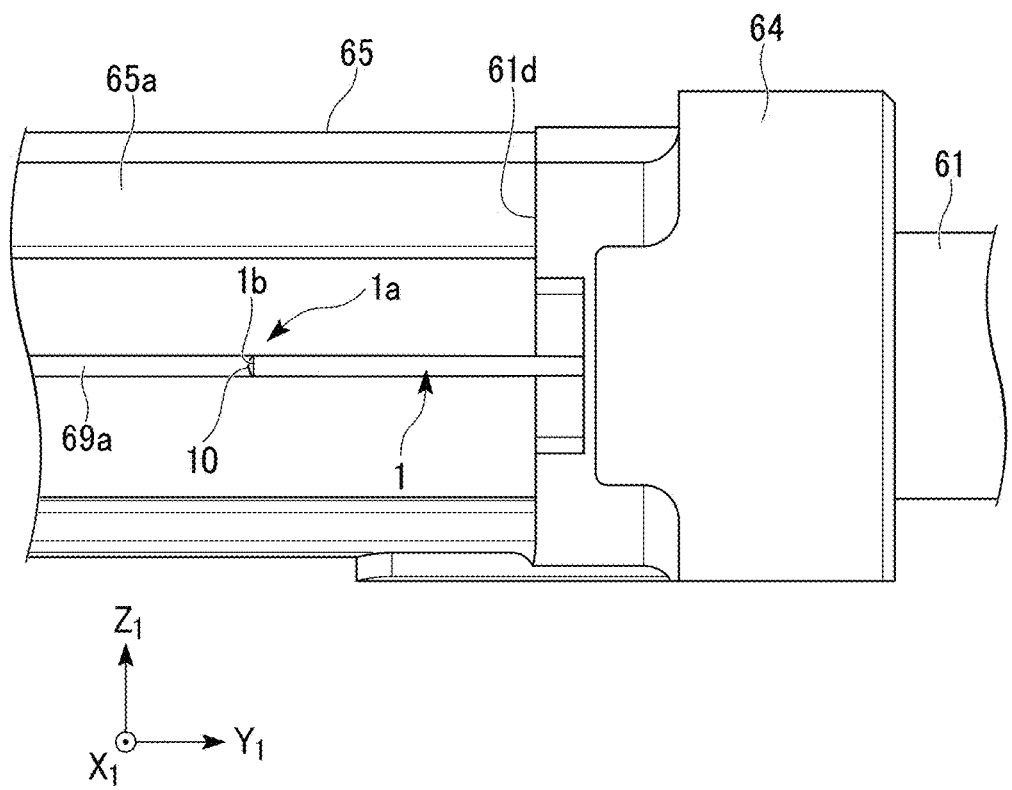
FIG. 3 is a diagram showing a second end of a first optical fiber which is disposed at a base member of the ferrule with a clamp of FIG. 2.
Figure 4:
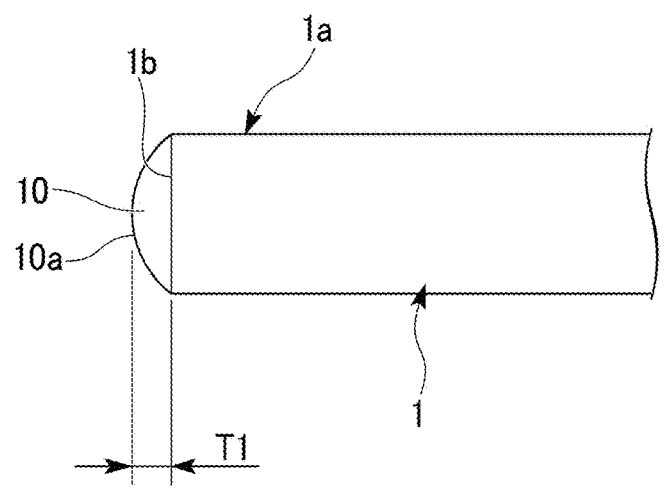
FIG. 4 is an enlarged view showing the second end of the first optical fiber shown in FIG. 2.

FIG. 3 is a diagram showing the rear end face 1b (end face in the −$Y_1$ direction) of the first optical fiber 1 and the second end 1a which is in the periphery thereof. In addition, FIG. 4 is an enlarged view showing the rear end face 1b of the first optical fiber 1.

A solid refractive index-matching material layer 10 is formed on the rear end face 1b of the first optical fiber 1. The refractive index-matching material layer 10 has a high refractive index-matching property between the first and second optical fibers 1 and 2 (degree of approximation between the refractive index of the refractive index-matching material layer 10 and the refractive indexes of the first and second optical fibers 1 and 2). The refractive index of the refractive index-matching material layer 10 may as well become closer to those of the optical fibers 1 and 2. However, from the viewpoint of a reduction in transmission loss due to the avoidance of Fresnel reflection, the difference between the refractive indexes of the optical fibers 1 and 2 is preferably within ±0.1, and is more preferably within ±0.05. In a case where the refractive indexes of the two optical fibers 1 and 2 which are butt-connected to each other are different from each other, the difference between the average value of the refractive indexes of the optical fibers 1 and 2 and the refractive index of the refractive index-matching material layer 10 is preferably within the above range.

It is preferable that the refractive index-matching material layer 10 can be elastically deformed.

Examples of materials of the refractive index-matching material layer 10 include high-polymer materials such as acryl series, epoxy series, vinyl series, silicone series, rubber series, urethane series, methacryl series, nylon series, bisphenol series, diol series, polyimide series, fluorinated epoxy series, or fluorinated alkyl series.

The refractive index-matching material layer 10 may be formed in a layer shape having a constant thickness, but is preferably formed in a shape having a thickness gradually decreasing from the center of the end face 1b toward the circumferential edge. For example, as shown in FIG. 3, the refractive index-matching material layer 10 can have its rear face 10a (face of the refractive index-matching material layer 10 which is formed in the −$Y_1$ direction) formed to be a curved-convex face (for example, spherical face or elliptic spherical face) protruding to the rear. The entirety of this rear face 10a may be a curved-convex face, and only a portion thereof may be a curved-convex face. The rear face 10a is formed to be a curved-convex face, and thus a core on the front end face center of the second optical fiber 2 which is butt-jointed to the first optical fiber 1 is reliably brought into contact with the refractive index-matching material layer 10, thereby allowing a connection loss to be reduced satisfactorily.

The refractive index-matching material layer 10 can be formed throughout the entire end face 1b of the first optical fiber 1. In addition, the refractive index-matching material layer 10 may be formed so as to reach not only the end face 1b, but also the outer circumferential face of the first optical fiber 1 near the second end 1a.

The refractive index-matching material layer 10 can be formed by, for example, the following method.

In a state where the first optical fiber 1 is electrically charged, the end face 1b of the second end 1a is brought close to the liquid level of a liquid refractive index-matching material, and this liquid refractive index-matching material is adsorbed (attached) to the end face 1b of the first optical fiber 1 and then is cured, to form the refractive index-matching material layer 10. In addition, the end face 1b may be cleaned using electrical discharge, in advance of the formation of the refractive index-matching material layer 10.

The refractive index-matching material layer 10 can also be formed by applying the liquid refractive index-matching material to the end face 1b, using other methods, without being limited to a method of electrically adsorbing the liquid refractive index-matching material.

Figure 5:
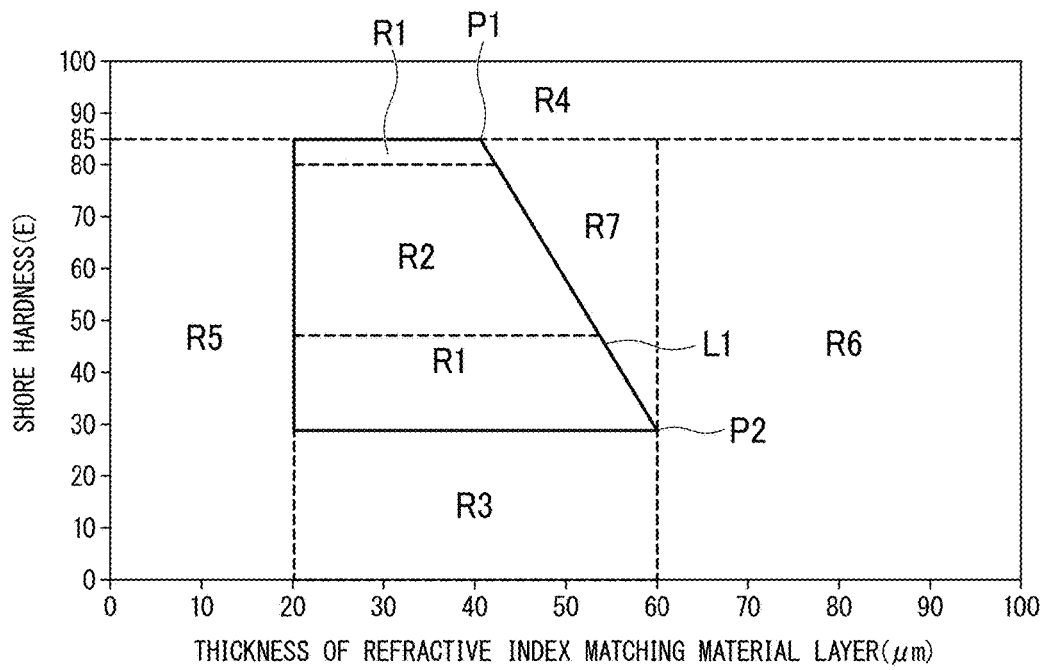
FIG. 5 is a diagram showing a preferred range of the physical properties of a refractive index-matching material which is used in a manufacturing method according to the first embodiment of the invention.

FIG. 5 shows a graph illustrating a relationship between a preferred thickness T1 (see FIG. 4) of the refractive index-matching material layer 10 and a preferred Shore hardness E (based on JIS K 6253).

In FIG. 5, range shown as regions R1 and R2 are preferred ranges in a case where a single-mode optical fiber is used as the second optical fiber 2 which is butt-jointed to the first optical fiber 1. In addition, the range shown as the region R2 is a preferred range in a case where a holey fiber is used as the second optical fiber 2.

The holey fiber is an optical fiber having a plurality of holes continuous in a waveguide direction. An example of the holey fiber (HF) includes a hole-assisted fiber (HAF) or the like.

As shown in FIG. 5, it is preferable that the Shore hardness E of the refractive index-matching material layer 10 be equal to or greater than 30 and equal to or less than 85.

In a case where the Shore hardness E of the refractive index-matching material layer 10 is excessively low (in, for example, a region R3), the refractive index-matching material layer 10 has a tendency to be peeled off from the end face 1b of the first optical fiber 1, but the Shore hardness E is set to be equal to or greater than 30, thereby allowing this peeling-off to be prevented from occurring.

Specifically, even in a case where a force is applied to the refractive index-matching material layer 10 due to, for example, a fluctuation in temperature or humidity within the alignment groove 69a, it is possible to prevent the refractive index-matching material layer 10 from being peeled off from the end face 1b.

In addition, the Shore hardness E of the refractive index-matching material layer 10 is set to be equal to or greater than 30, and thus it is possible to prevent deformation such as wrinkle formation causing a loss increase from occurring in the refractive index-matching material layer 10.

In a case where the Shore hardness E of the refractive index-matching material layer 10 is excessively high (in, for example, a region R4), the viscosity of a refractive index-matching material when uncured becomes higher, and thus it is difficult to attach the material to the end face 1b of the first optical fiber 1. The Shore hardness E is set to be equal to or less than 85, and thus an operation for attaching the refractive index-matching material to the end face 1b is facilitated, thereby allowing the refractive index-matching material layer 10 having a predetermined shape (for example, shape forming the aforementioned curved-convex face) to be accurately formed.

In addition, the Shore hardness E of the refractive index-matching material layer 10 is set to be equal to or less than 85, and thus sufficient follow-up deformation can be performed on the ends of the first and second optical fibers 1 and 2. Therefore, even in a case where a force is applied to the refractive index-matching material layer 10 due to, for example, a fluctuation in temperature or humidity within the alignment groove 69a, it is possible to avoid the occurrence of a gap or the like causing a loss increase.

It is preferable that the thickness T1 of the refractive index-matching material layer 10 be equal to or greater than 20 μm and equal to or less than 60 μm.

The thickness T1 of the refractive index-matching material layer 10 is, for example, the thickness of the central portion of the refractive index-matching material layer 10 and is a maximum thickness. A case where the refractive index-matching material layer 10 is formed to have a uniform thickness means the uniform thickness.

In a case where the refractive index-matching material layer 10 is excessively thin (in, for example, a region R5), it is not possible to exhibit an effect as a refractive index-matching material when a distance between the ends of the first and second optical fibers 1 and 2 which are butt-jointed to each other increases. In a case where the thickness is set to be equal to or greater than 20 μm, it is possible to reliably obtain the effect as a refractive index-matching material, which is advantageous.

In addition, the thickness is set to be equal to or greater than 20 μm, and thus sufficient follow-up deformation can be performed on the ends of the first and second optical fibers 1 and 2 which are butt-jointed to each other. Thereby, it is possible to avoid the occurrence of a gap or the like causing a loss increase.

In a case where the refractive index-matching material layer 10 is excessively thick (in, for example, a region R6), the positions of the ends of the first and second optical fibers 1 and 2 which are butt-jointed to each other are not stabilized, and thus initial characteristics have a tendency to fluctuate.

In addition, the stability of the optical fiber end position is influenced by the hardness of the refractive index-matching material layer 10.

When a straight line that links a point P1 of Shore hardness E85 and thickness 40 μm and a point P2 of Shore hardness E30 and thickness 60 μm is set to a straight line L1, the end positions of the optical fibers described above have a tendency to be destabilized in a region (such as the region R1) on a side which is smaller in thickness than that of the straight line L1, inclusive of the straight line, as compared to a region (such as a region R7) on a side which is larger in thickness than that of the straight line L1.

Thus, in a region in which the Shore hardness E of the refractive index-matching material layer 10 is equal to or greater than 30 and equal to or less than 85, the thickness thereof is equal to or greater than 20 μm and equal to or less than 60 μm, and the region R7 is excluded, that is, a range surrounded by (Shore hardness E; 30, thickness; 20 μm), (Shore hardness E, 85, thickness; 20 μm), (Shore hardness E; 85, thickness; 40 μm), and (Shore hardness E: 30, thickness: 60 μm), it is possible to prevent the refractive index-matching material layer 10 from being peeled off, and to accurately form the refractive index-matching material layer 10. Further, initial characteristics are stabilized, and thus it is possible to reliably keep a connection loss low.

In a case where the second optical fiber 2 is a holey fiber (see FIG. 6) within the region R1, and in the region R2 in which the Shore hardness E is equal to or greater than 45 and equal to or less than 80, it is possible to reduce a connection loss.

The reason for being capable of reducing a connection loss satisfactorily due to the use of the refractive index-matching material layer 10 in the region R2 can be considered as follows.

As shown in FIG. 6, the second optical fiber 2 which is a holey fiber has a core 5 located at its cross-sectional center, and has a plurality of holes 4 penetrating along the core 5 in the periphery of the core 5 formed therein. In a case where the second optical fiber 2 is such a holey fiber, the second optical fiber is butt-jointed to the first optical fiber 1, and thus the surface of the refractive index-matching material layer 10 is formed in a shape having irregularities depending on the end face 2c having the holes 4. Thereby, the refractive index-matching material layer 10 is not likely to slidably move in its plane direction with respect to the end face 2c.

In a case where the hardness of the refractive index-matching material layer 10 is excessively low (in a case where the Shore hardness E is less than 45), the adjustment of axis misalignment after the first optical fiber 1 and the second optical fiber 2 are butt-jointed to each other within the alignment groove 69a may cause concern that a large shearing force in a plane direction is applied to the refractive index-matching material layer 10 due to the end face 2c of the second optical fiber 2, to thereby incur deformation such as wrinkle formation causing a loss increase.

On the other hand, in a case where the hardness of the refractive index-matching material layer 10 is excessively high (in a case where the Shore hardness E exceeds 80), there may cause concern that sufficient follow-up deformation cannot be made during the positioning of the optical fiber end within the alignment groove 69a, and that a gap or the like causing a loss increase occurs.

In contrast, in a case where the refractive index-matching material layer 10 in the region R2 (the Shore hardness E is equal to or greater than 45 and equal to or less than 80) is used, sufficient follow-up deformation can be performed on the optical fiber end to be positioned. Thereby, a gap or the like causing a loss increase does not occur, and deformation such as wrinkle formation is not likely to occur. Therefore, it is possible to reduce a connection loss.

In the refractive index-matching material layer 10, the Shore hardness E is set to be equal to or less than 85, and thus followability increases. However, since the hardness is low, when a load is applied from the outside to the surface of this refractive index-matching material layer 10, the surface may not be restored. Therefore, when the end face 2b (that is, the surface of the refractive index-matching material layer 10) is positioned by pressing or the like in order to position the first optical fiber 1 on the alignment groove 69a in its length direction, there may be a concern of the surface being deformed. When the first optical fiber 1 and the second optical fiber are butt-jointed to each other in a deformed state, wrinkles are formed, and thus an increase in a connection loss is caused.

In addition, when the first optical fiber 1 having the refractive index-matching material layer 10 formed thereon is placed on the alignment groove 69a, the refractive index-matching material layer 10 may adhere to the alignment groove 69a. When the first optical fiber 1 is positioned in its length direction in this state, the first optical fiber is pulled to a portion to which the refractive index-matching material layer 10 adheres, and thus there may be a concern that the refractive index-matching material layer 10 is peeled off from the end face 1b. The peeling-off strength of the refractive index-matching material layer 10 is associated with the Shore hardness, and thus it is possible to increase the peeling-off strength by increasing the Shore hardness. However, in a case where the Shore hardness E is equal to or greater than 85, it is not possible to act against this peeling-off force, and thus the refractive index-matching material layer 10 is peeled off from the end face 1b of the first optical fiber 1. The occurrence of peeling-off may cause an increase in a connection loss.

As described above, in a case where the Shore hardness E of the refractive index-matching material layer 10 is set to be equal to or less than 85, the positioning of the first optical fiber 1 on the alignment groove 69a in its length direction may cause concern of the refractive index-matching material layer 10 being peeled off.

According to a manufacturing method of the present embodiment described later in detail, it is not necessary to position the first optical fiber 1 on the alignment groove 69a in is length direction. Therefore, even in a case where such a refractive index-matching material layer 10 is formed, it is possible to reduce a connection loss satisfactorily.

In a manufacturing field, the ferrule 60 with a clamp is combined with the knob 91, the plug frame 92, the rear-side housing 40, and the spring 53, and is prepared in an installation field as an optical connector (shown in FIG. 1 as the exploded optical connector 110).

In the installation field, the cable terminal 31a with a fixed member is inserted and assembled from the rear of the optical connector. Specifically, first, the cable terminal 31a with a fixed member is placed on an insertion auxiliary slider 45 provided in the rear-side housing 40. Further, the cable terminal 31a with a fixed member is moved forward in the +Y₁ direction, and the second optical fiber 2 protruding from the terminal of the optical fiber cable 31 is fed into the alignment groove 69a of the ferrule 60 with a clamp. Thereby, the bare optical fiber 2a of the front end of the second optical fiber 2 is butt-jointed to the first optical fiber 1.

A procedure of feeding the second optical fiber 2 protruding from the terminal of the optical fiber cable 31 into the alignment groove 69a of the ferrule 60 with a clamp is performed in a state where the gap of the clamp 63 is extended.

As shown in FIG. 2, the clamp 63 is configured such that the first interposition element 65 and the second interposition element 58 are held by the clamp spring 68 from the outer circumference. Therefore, a wedge-shaped interposition piece (not shown) is inserted between the first interposition element 65 and the second interposition element 58, and thus it is possible to extend a gap between the first and second interposition elements 65 and 58.

FIG. 6 shows a status of the end faces 1b and 2c of the second optical fiber 2 and the first optical fiber 1 which are butt-jointed to each other. The front end face 2c of the second optical fiber 2 is butt-jointed to the rear end face 1b of the first optical fiber 1 with the refractive index-matching material layer 10 interposed therebetween, and the connection portion 57 is formed. The refractive index-matching material layer 10 is elastically compressed and deformed in a thickness direction. Thereby, the refractive index-matching material layer 10 is in extensive contact with the central portion of the front end face 2c of the second optical fiber 2 and the periphery thereof in an annular shaped. Thereby, the first optical fiber 1 and the second optical fiber 2 are optically connected to each other.

As shown in FIG. 1, the cable terminal 31a with a fixed member is housed inside the rear-side housing 40 by a forward movement. Further, an anchoring cover 46 provided in the rear-side housing 40 is rotated and covers the cable terminal 31a with a fixed member. Thereby, a retreat regulating piece 46f of the anchoring cover 46 is brought into contact with the rear end of the anchoring fixed member 32 of the cable terminal 31a with a fixed member, and thus the retreat of the cable terminal 31a with a fixed member can be regulated. In addition, the cable terminal 31a with a fixed member comes into contact with a protruding portion or the like (not shown) within the rear-side housing 40, and thus the forward movement thereof is regulated.

Thereby, the position of the cable terminal 31a with a fixed member in a front-back direction is determined, and thus it is possible to maintain a state of the butt connection of the second optical fiber 2 to the first optical fiber 1 of the ferrule 60 with a clamp.

Next, the interposition piece is removed from the clamp 63 into which the wedge-shaped interposition piece is inserted. Thereby, the clamp 63 holds and fixes the connection portion 57 between the first optical fiber 1 and the second optical fiber 2 with the elasticity of the clamp spring 68. The state of the butt connection of the second optical fiber 2 to the first optical fiber 1 built into the ferrule 60 with a clamp is stably maintained by the motion of the clamp 63.

Next, an assembling procedure of the ferrule 60 with a clamp will be described with reference to FIG. 2.

First, the ferrule 61 including the flange 64 and the base member 65 are assembled, and the ferrule structure 59 is fabricated. In addition, the first optical fiber 1 is cut off by a predetermined length, and the refractive index-matching material layer 10 is formed on the end face 1d of the second end 1a. Next, the first optical fiber 1 is built-in and fixed to the fiber hole 61a of the ferrule structure 59. Further, the front end face 61b of the ferrule 61 is polished so that the front end face 61b of the ferrule 61 and the front end face 1d of the first optical fiber 1 are flush with each other. Next, the lid members 66 and 67 and the clamp spring 68 constituting the clamp 63 are assembled, and the ferrule 60 with a clamp is fabricated.

In such manufacturing processes, it is necessary to prevent the refractive index-matching material layer 10 formed on the end face 1d of the first optical fiber 1 from being damaged. The damage means that a crack is formed on the surface of the refractive index-matching material layer 10, the refractive index-matching material layer 10 is peeled off from the rear end face 1b, or the like. In a case where damage is generated in the refractive index-matching material layer 10, there may be a concern that a connection loss increases in the connection portion 57 (see FIG. 6) between the first optical fiber 1 and the second optical fiber 2.

Figure 7A:
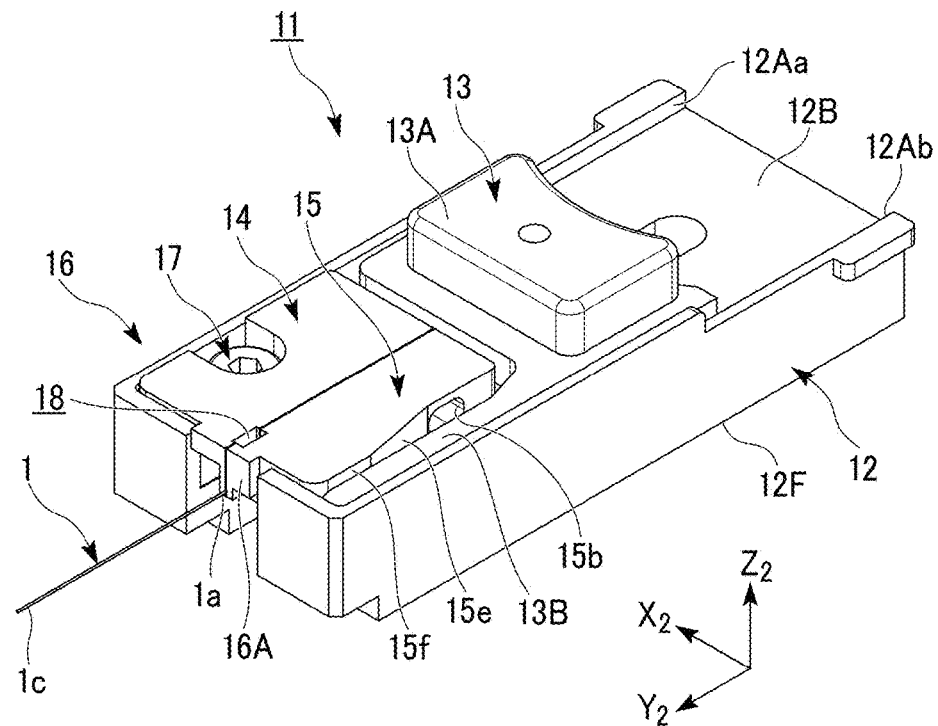
FIG. 7A is a perspective view showing a state where an optical fiber holder according to the first embodiment of the invention holds the first optical fiber.
Figure 7B:
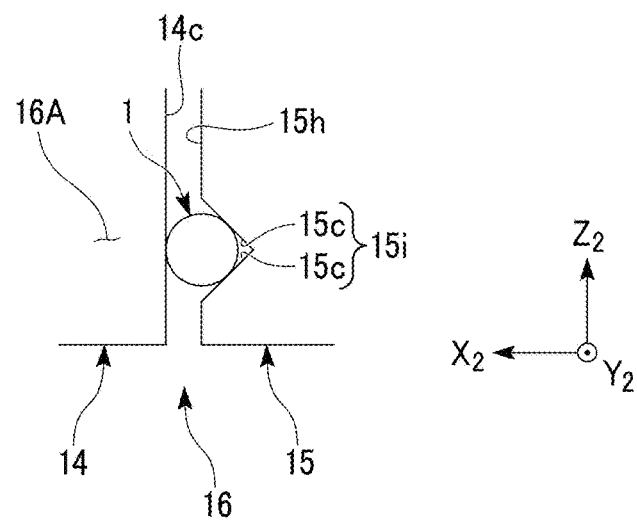
FIG. 7B is a front view showing a holding portion illustrating a state where the optical fiber holder according to the first embodiment of the invention holds the first optical fiber.

In the above assembling procedure, it is preferable to use an optical fiber holder 11 shown in FIGS. 7A and 7B, in order to prevent the refractive index-matching material layer 10 from being damaged. The optical fiber holder 11 can hold the first optical fiber 1 so as to protect the refractive index-matching material layer 10.

(Optical Fiber Holder)

Hereinafter, the optical fiber holder 11 will be described with reference to FIGS. 7A to 9C. FIGS. 7A to 9C depict the $X_2$-$Y_2$-$Z_2$ coordinate system. In these drawings, the length direction of the first optical fiber 1 held by the optical fiber holder 11 is set to a $Y_2$-axis direction, and the front end side thereof is set to a $+Y_2$ direction. In addition, the $X_2$-$Y_2$-$Z_2$ coordinate system is set so that a slide face 12B of the optical fiber holder 11 is in parallel to the $X_2$-$Y_2$ plane.

Hereinafter, configuration members of the optical fiber holder 11 will be described mainly with reference to FIG. 8A which is the exploded view showing the optical fiber holder 11.

The optical fiber holder 11 is schematically constituted by a guide member 12, a press member 13, and an optical fiber holding portion 16 (holding portion 16).

The slide face 12B extending in the $Y_2$-axis direction and a holding portion mounting face 12D of the slide face 12B which is located on the $+Y_2$ side are formed on the upper surface of the guide member 12. The slide face 12B and the holding portion mounting face 12D are formed to have a stepped difference so that the holding portion mounting face 12D becomes a lower side.

The press member 13 is mounted on the slide face 12B. In addition, the holding portion 16 is mounted on the holding portion mounting face 12D.

A notch portion 12E is formed at the center of the end face of the guide member 12 in the $+Y_2$ direction so as to divide the holding portion mounting face 12D into two parts.

A lower surface 12F of the guide member 12 is a surface facing a slider 71 when the guide member 12 is mounted on the slider 71 (see FIG. 10 or the like) described later.

The press member 13 is mounted on the slide face 12B, and is configured to be capable of linearly moving (sliding) in the $Y_2$-axis direction which is the extending direction of the slide face 12B.

A pair of slide guides 12Aa and 12Ab protruding upward are formed on both sides ($+X_2$ side and $-X_2$ side) of the slide face 12B. The slide guides 12Aa and 12Ab are formed in parallel to each other. In addition, the slide guides 12Aa and 12Ab extend to both sides of the holding portion mounting face 12D.

The distance between the slide guides 12Aa and 12Ab is slightly larger than the width (length in the $X_2$-axis direction) of the press member 13. The press member 13 can linearly move along the slide guides 12Aa and 12Ab.

A long hole 12C extending in parallel to the slide guides 12Aa and 12Ab passes through the center of the slide face 12B. A guide pin 20B is inserted into this long hole 12C from the lower surface 12F side through a guide bush 20A.

The guide pin 20B is configured such that the lower end thereof is provided with a flange, and that the upper end thereof is fixed to the press member 13. The press member 13 does not slide down from the slide face 12B due to the guide pin 20B, and can move linearly.

The press member 13 includes a press member main body 13A and a press piece 13B, and is formed in an L-shape when seen in plan view. The press member main body 13A is formed in a block shape, and the width thereof is formed to be approximately the same as or slightly smaller than the width of the slide face 12B. It is preferable that this press member main body 13A be formed in a shape which has a tendency to be linearly moved in the $Y_2$-axis direction by applying a force with a worker's finger and applying a force to the press member 13.

The press piece 13B extends from the face of the press member main body 13A on the $+Y_2$ side. The press piece 13B extends to the holding portion 16 side ($+Y_2$ direction) along the slide guide 12Ab on the $-X_2$ side out of a pair of slide guides 12Aa and 12Ab of the guide member 12.

The holding portion 16 includes a first holding member 14, a second holding member 15, a compression spring 19, and a fixation screw 17. The holding portion 16 is mounted on the holding portion mounting face 12D which is formed on the $+Y_2$ side of the upper surface of the guide member 12. The first holding member 14 and the second holding member 15 of the holding portion 16 are formed in a block shape.

The first holding member 14 and the second holding member 15 are disposed side by side in the $X_2$-axis direction between the slide guides 12Aa and 12Ab. The first holding member 14 on the fixed side is disposed along the slide guide 12Aa on the $+X_2$ side, and the second holding member 15 is disposed between the first holding member 14 and the slide guide 12Ab on the $-X_2$ side. A gap in which the press piece 13B of the press member 13 is inserted and extracted is formed between the second holding member 15 and the slide guide 12Ab on the $-X_2$ side.

The first holding member 14 is fixed to the guide member 12. This fixation is performed by screw-fitting the fixation screw 17 to a screw hole 12Da provided on the holding portion mounting face 12D through the second holding member 15.

In the first holding member 14, a guide pin 14A is fixed to an opposite face 14a facing the second holding member 15 and extends out to the second holding member 15 side. In addition, in the second holding member 15, a guide hole 15b corresponding to the guide pin 14A is provided on an opposite face 15a facing the first holding member 14.

The second holding member 15 is configured such that operations other than that in the $X_2$-axis direction is regulated with respect to the first holding member 14 by the guide pin 14A and the guide hole 15b.

A spring holding hole 14b is provided on the mutual opposite face 14a of the first holding member 14, and the compression spring 19 is built thereinto. The compression spring 19 is compressed and interposed between the first holding member 14 and the second holding member 15. The compression spring 19 applies a force for separating the first holding member 14 and the second holding member 15 from each other.

The second holding member 15 includes a first pressed face 15e and a second pressed face 15f on a face located on the opposite side of the opposite face 15a. The first pressed face 15e is formed obliquely so as to become more distant from the first holding member 14 toward the $+Y_2$ direction. In addition, the second pressed face 15f is formed in parallel to the extending direction ($+Y_2$ direction) of the press piece 13B. The press piece 13B of the press member 13 comes into contact with the first and second pressed faces 15e and 15f, and thus the second holding member 15 is driven in the $+X_2$ direction.

A first holding surface 14c is formed on the front end of the first holding member 14 on the $+Y_2$ side. The first holding surface 14c is formed in the same plane as the opposite face 14a. A groove-shaped recessed portion 14d extending in a $Z_2$-axis direction is formed between the opposite face 14a and the first holding surface 14c, and the recessed portion 14d partitions the opposite face 14a and the first holding surface 14c.

Similarly, a V-groove formation face 15h is formed in the front end of the second holding member 15 on the $+Y_2$-side, and the same plane as the opposite face 15a. The V-groove formation face 15h has a groove-shaped recessed portion 15d extending in the $Z_2$-axis direction formed between the opposite face 14a and the V-groove formation face 15h, and partitions the opposite face 15a and the V-groove formation face 15h. A V-groove 15i extending in the $Y_2$-axis direction is formed on the V-groove formation face 15h.

Figure 8B:
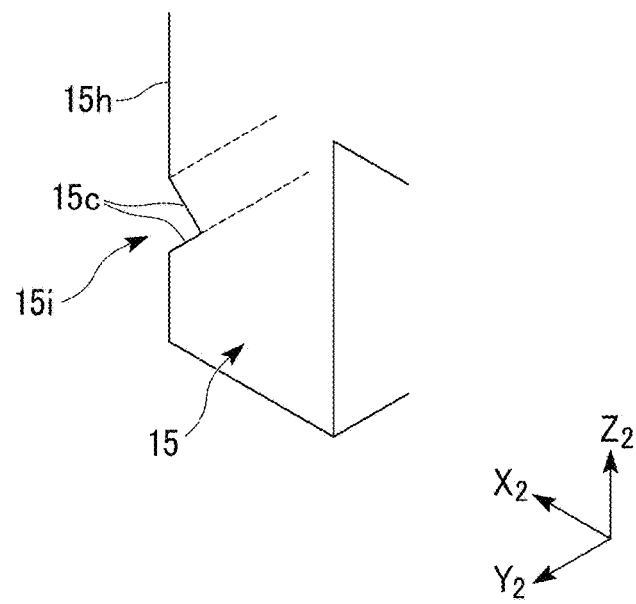
FIG. 8B is an enlarged view showing a second holding member constituting the holding portion illustrating the exploded view showing the optical fiber holder shown in FIGS. 7A and 7B.

FIG. 8B shows an enlarged view showing the V-groove 15i. The V-groove 15i has a pair of second holding surfaces 15c and 15c formed obliquely with respect to the V-groove formation face 15h, and is formed in a cross-section V-shape.

FIG. 7A is a perspective view showing the optical fiber holder 11 in a state where the first optical fiber 1 is held. FIG. 7B is an enlarged view from the $+Y_2$ side of the optical fiber holder 11 shown in FIG. 7A.

As shown in FIG. 7B, the first holding surface 14c of the first holding member 14 comes into contact with the first optical fiber 1. In addition, the second holding surfaces 15c and 15c of the second holding member 15 come into contact with the first optical fiber 1. The first holding surface 14c and the second holding surfaces 15c and 15c are in line-contact with the first optical fiber 1. Therefore, the outer circumference of the first optical fiber 1 is held by three contact lines which are in parallel to each other. By such holding, the first optical fiber 1 does not deviate from each of the holding surfaces 14c and 15c, and thus can be held with respect to the optical fiber holder 11 without axis misalignment.

Next, the statuses of the opening and closing of the holding portion 16 of the optical fiber holder 11 and the holding of the first optical fiber 1 will be described with reference to FIGS. 9A to 9C.

Figure 9A:
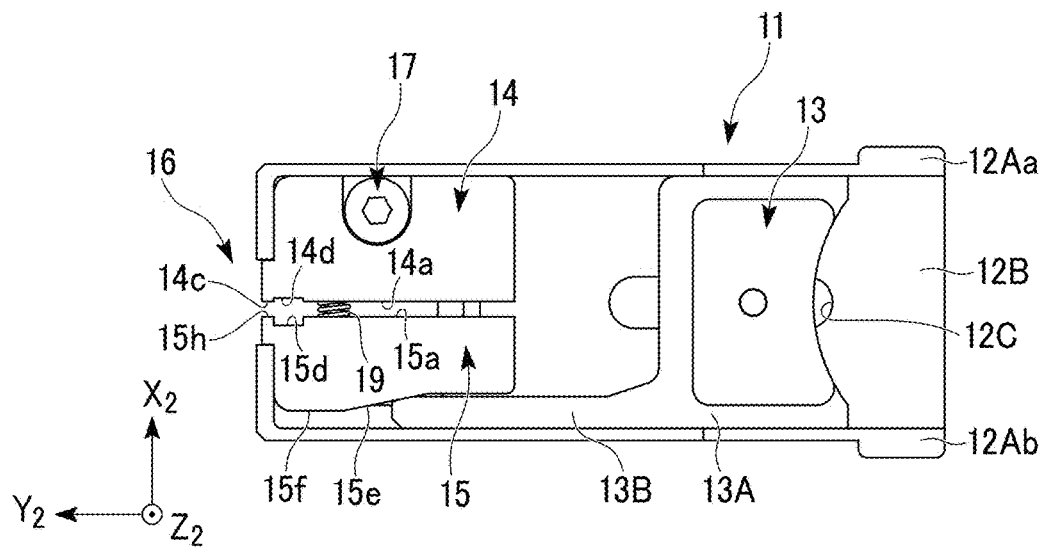
FIG. 9A is a top view showing the optical fiber holder shown in FIGS. 7A and 7B, and a diagram showing a state where the holding portion is opened.

FIG. 9A shows a state (hereinafter, referred to as an opened state) where the holding portion 16 of the optical fiber holder 11 is opened. In the opened state, the press member 13 is disposed on the rear (holding portion 16 side, $-Y_2$ side) of the slide face 12B of the guide member 12. In addition, the press piece 13B of the press member 13 does not come into contact with the second pressed face 15f of the second holding member 15, and comes into contact with the first pressed face 15e, or does not come into contact with any of the pressed faces (first pressed face 15e and second pressed face 15f).

In the opened state, a gap having a size equal to or greater than the outside diameter of the first optical fiber 1 is formed between the first holding member 14 and the second holding member 15. This is because the compression spring 19 is interposed between the first holding member 14 and the second holding member 15, and the compression spring 19 separates the first holding member 14 and the second holding member 15 from each other.

Figure 9B:
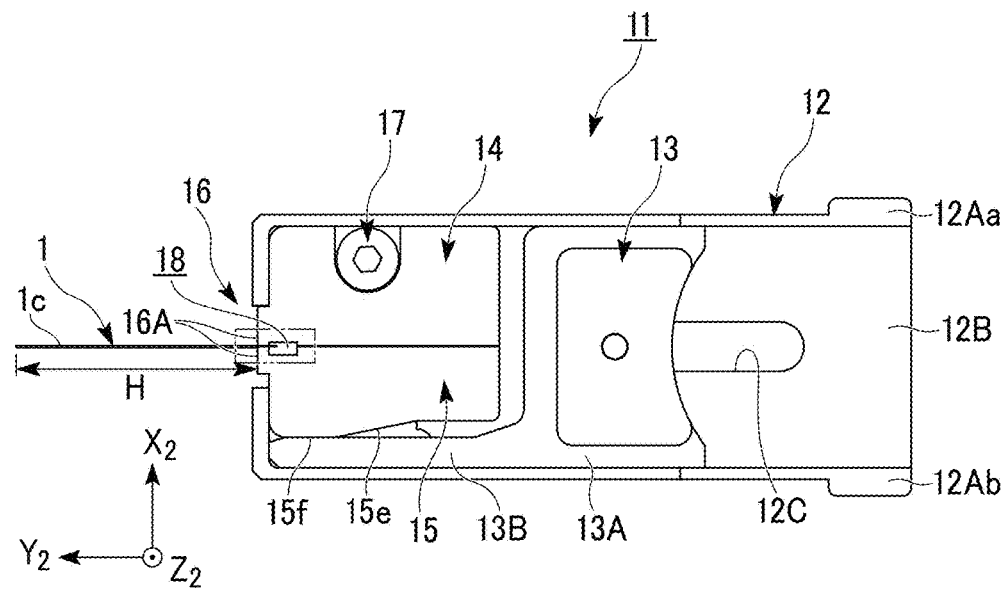
FIG. 9B is a top view showing the optical fiber holder shown in FIGS. 7A and 7B, and a diagram showing a state where the holding portion is closed.

FIG. 9B shows a state (hereinafter, referred to as a closed state) where the holding portion 16 of the optical fiber holder 11 is closed. In the closed state, the press member 13 is disposed on the front ($+Y_2$ side) of the slide face 12B. In addition, the press piece 13B of the press member 13 comes into contact with the second pressed face 15f of the second holding member 15.

A worker can shift the optical fiber holder 11 from the opened state to the closed state by transferring the press member 13 in the $+Y_2$ direction on the slide face 12B. The press piece 13B of the press member 13 slidably moves on the first pressed face 15e, and reaches the second pressed face 15f. The press piece 13B slidably moves on the first pressed face 15e which is inclined, and the second holding member 15 is pressed in the $+X_2$ direction and moves to the first holding member 14 side.

By a shift from the opened state to the closed state, the first holding member 14 and the second holding member 15 of the holding portion 16 come close to each other, and the first optical fiber 1 can be interposed and held by the holding surfaces 14c and 15c (see FIG. 7B).

Figure 9C:
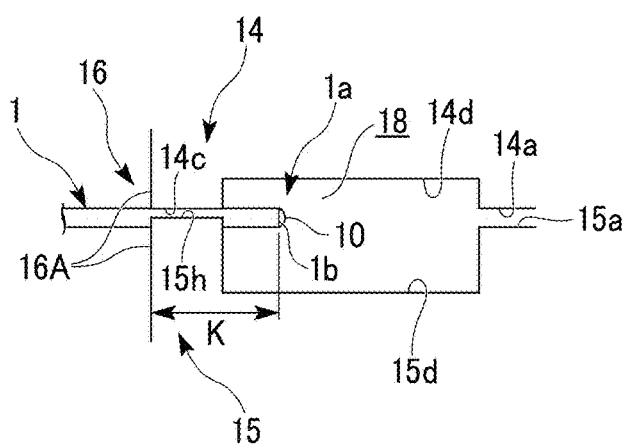
FIG. 9C is a top view showing the optical fiber holder shown in FIGS. 7A and 7B, and an enlarged view showing the closed holding portion.

FIG. 9C shows the second end 1a of the first optical fiber 1 which is held by the holding portion 16. As shown in FIGS. 9C and 71, in the closed state, a gap corresponding to the diameter of the first optical fiber 1 is formed between the opposite face 14a of the first holding member 14 and the opposite face 15a of the second holding member 15. This gap is appropriately set, and thus it is possible to hold the first optical fiber 1 through both sides thereof in a radial direction without damaging the first optical fiber.

In addition, it is preferable that the first holding member 14 and the second holding member 15 be made of a resin, and that a load applied to the first optical fiber 1 be reduced. Additionally, an elastic sheet formed of silicon rubber or the like is attached to the surfaces of the first holding surface 14c and the second holding surface 15c, and thus a load applied to the first optical fiber 1 may be reduced.

In the second end 1a of the first optical fiber 1, a position apart from the rear end face 1b having the refractive index-matching material layer 10 formed thereon is interposed by the holding portion 16. The end face of the holding portion 16 (first holding member 14 and the second holding member 15) in the $+Y_2$ direction is referred to as a reference surface 16A. The reference surface 16A is a face formed in parallel to an $X_2$-$Z_2$ plane.

As shown in FIG. 9C, the holding portion 16 holds the first optical fiber 1 so that a distance from the reference surface 16A to the rear end face 1b is set to K. This distance K is larger than the lengths of the first holding surface 14c and the V-groove formation face 15h in the $Y_2$-axis direction.

The first holding member 14 and the second holding member 15 have the recessed portion 14d and the recessed portion 15d located further inside than the reference surface 16A. In the closed state, the recessed portion 14d and the recessed portion 15d come close to each other, have a rectangular shape when seen in plan view, and form a protective space 18 penetrating in the $Z_2$-axis direction.

The distance K from the reference surface 16A to the rear end face 1b of the first optical fiber 1 is made to be larger than the lengths of the first holding surface 14c and the V-groove formation face 15h in the $Y_2$-axis direction, and thus the rear end face 1b of the first optical fiber 1 is disposed within the protective space 18. Thereby, the refractive index-matching material layer 10 formed on the rear end face 1b does not come into contact with the first holding member 14 and the second holding member 15.

By such holding, it is possible to prevent the refractive index-matching material layer 10 of the first optical fiber 1 from being damaged.

A procedure of cutting off the first optical fiber 1 and holding the cut optical fibers using the optical fiber holder 11 will be described.

First, the refractive index-matching material layer 10 is formed on the end face 1b of the first optical fiber 1 before cutting.

Next, the second end 1a on this end face 1b side is held by the holding portion 16 of the optical fiber holder 11. The holding portion 16 of the optical fiber holder 11 accurately holds the rear end face 1b of the first optical fiber 1 so as to be set to the aforementioned distance K with respect to the reference surface 16A, and places the rear end face 1b within the protective space 18.

Next, as shown in FIG. 9A, the first optical fiber 1 is cut off and the first end 1c is formed so as to be set to a distance H from the reference surface 16A of the holding portion 16. In this manner, the first and second ends 1c and 1a of the first optical fiber 1 are accurately disposed from the reference surface 16A, and thus it is possible to accurately cut off the first optical fiber 1. In addition, it is possible to accurately locate the first and second ends 1c and 1a with respect to the optical fiber holder 11.

(Insertion Procedure of Optical Fiber)

A procedure of inserting the first optical fiber 1 held by the optical fiber holder 11 into the fiber hole 61a will be described with reference to FIGS. 10 to 14C.

FIGS. 10 to 14C depict an $X_3$-$Y_3$-$Z_3$ coordinate system. This coordinate system is disposed so that the longitudinal direction of the ferrule 61 is set to a $Y_3$-axis direction and the front end face 61b is set to a $+Y_3$ side. In addition, this coordinate system is disposed so that the opposite face 65a of the base member 65 is set to an $X_3$-$Y_3$ plane.

Figure 10:
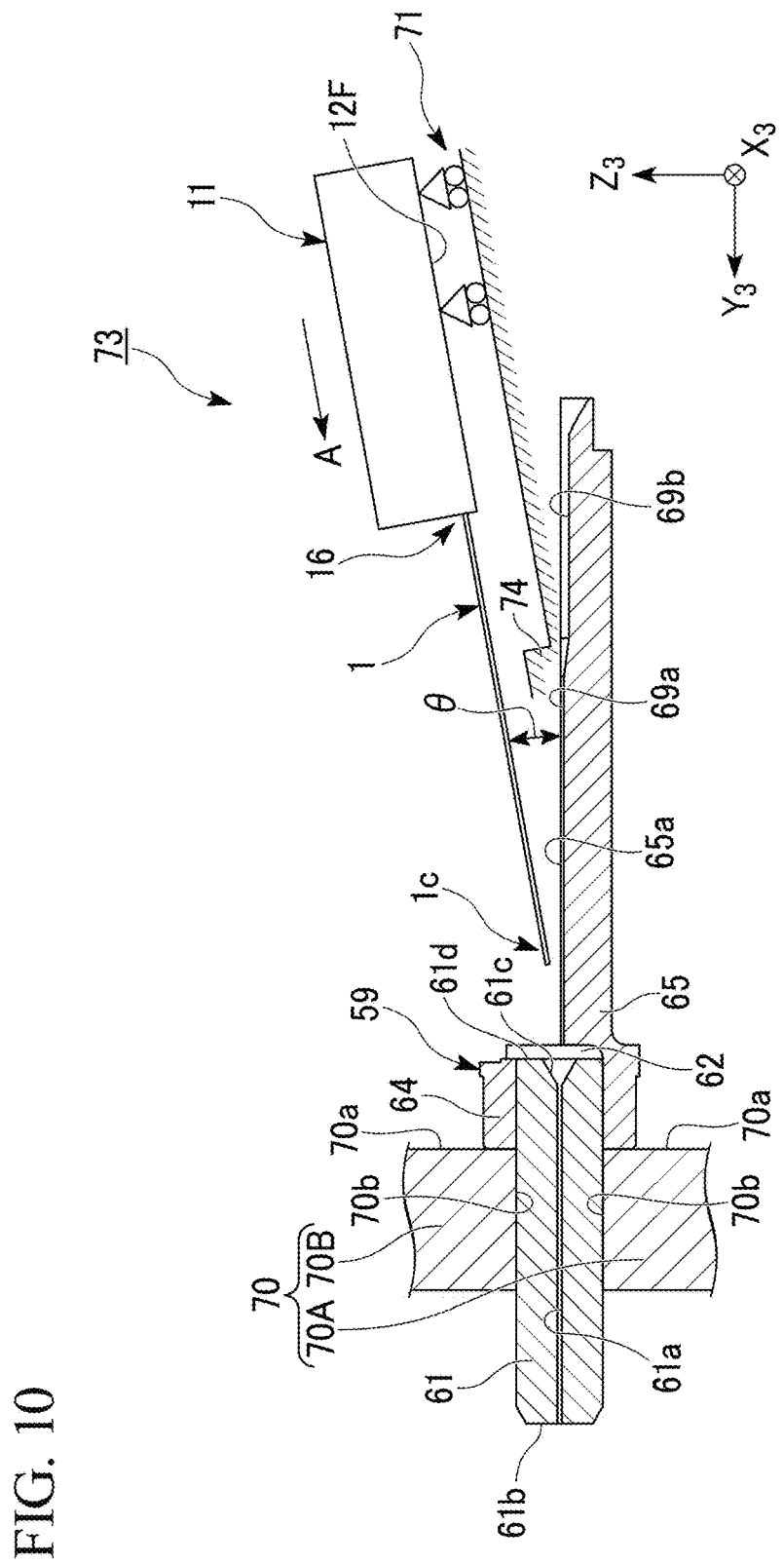
FIG. 10 is a diagram showing an optical fiber insertion device according to the first embodiment of the invention, and a schematic diagram of a preparation state of inserting an optical fiber into a fiber hole.

FIG. 10 shows a preparation state where the ferrule structure 59 is attached to an optical fiber insertion device 73 (insertion device 73).

The optical fiber insertion device 73 is schematically constituted by a ferrule-holding jig 70, the optical fiber holder 11, and the slider 71 that is used to mount the optical fiber holder 11 thereon. The ferrule-holding jig 70 and the slider 71 are fixed to a base (not shown) of the insertion device 73, and a mutual positional relationship therebetween is maintained.

The ferrule-holding jig 70 includes a lower jig 70A and an upper jig 70B, and is configured such that these jigs can be opened and closed. The lower jig 70A and the upper jig 70B include curved recessed portions 70b and 70b along the outside diameter of the ferrule 61. In addition, positioning faces 70a and 70a orthogonal to the axial direction of the ferrule 61 are formed on the lower jig 70A and the upper jig 70B.

The holding of the ferrule structure 59 using the ferrule-holding jig 70 is performed by the following procedure.

First, the ferrule 61 of the ferrule structure 59 is placed on the lower jig 70A. In this case, the opposite face 65a of the base member 65 is disposed so as to face upward. Next, the flange 64 is brought into contact with the positioning faces 70a. Further, the upper jig 70B is disposed above the ferrule 61, and is fixed to the lower jig 70A. Thereby, the curved recessed portions 70b and 70b of the lower jig 70A and the upper jig 70B hold the outer circumference of the ferrule 61, and thus the ferrule-holding jig 70 can be held in a positioned state.

Previously, the fiber hole 61a of the ferrule 61 in which the above procedure is performed is filled with an adhesive which is not shown in the figure. The first optical fiber 1 is fixed to the fiber hole 61a by this adhesive. The adhesive is not shown in the drawings except for a case where a special description is given. However, in FIGS. 10 to 14C, the adhesive is filled into the fiber hole 61a.

The slider 71 is, for example, a linear slider, and is configured to be capable of linearly move smoothly in the direction of an arrow A in FIG. 10. The arrow A is the direction of an elevation angle θ with respect to a $Y_3$-axis. That is, the slider 71 is within a plane parallel to the $X_3$-$Y_3$ plane, and linear moves in the direction of the elevation angle θ with respect to the $Y_3$-axis. The slider 71 is disposed on the base member 65 side of the ferrule structure 59.

In addition, the slider 71 is provided with a forward-movement limiter 74 in the front of the traveling direction (direction of the arrow A), and this forward-movement limiter 74 determines the forward-movement limit of the optical fiber holder 11. The slider 71 comes into contact with (interferes with) the forward-movement limiter 74, and thus the forward movement thereof is interfered with.

The optical fiber holder 11 is attached to the slider 71 so that the lower surface 12F of the guide member 12 shown in FIG. 7A becomes a placement surface. Therefore, the optical fiber holder 11 is disposed so that the movable direction of the second holding member 15 is coincident with the $X_3$-axis.

The first optical fiber 1 is held by the optical fiber holder 11. As shown in FIG. 7A, the first optical fiber 1 is configured such that the second end 1a side is held by the holding portion 16 of the optical fiber holder 11. In addition, the first end 1c extends from the reference surface 16A of the optical fiber holder 11.

The optical fiber holder 11 is mounted on the slider 71, and thus the first optical fiber 1 is disposed so as to extend toward the base member 65 of the ferrule structure 59. The alignment groove 69a is formed on the opposite face 65a of the base member 65. In the ferrule structure 59 and the optical fiber holder 11, a mutual positional relationship therebetween is determined so that the extending direction of the optical fiber holder 11 is coincident with the alignment groove 69a.

Figure 11A:
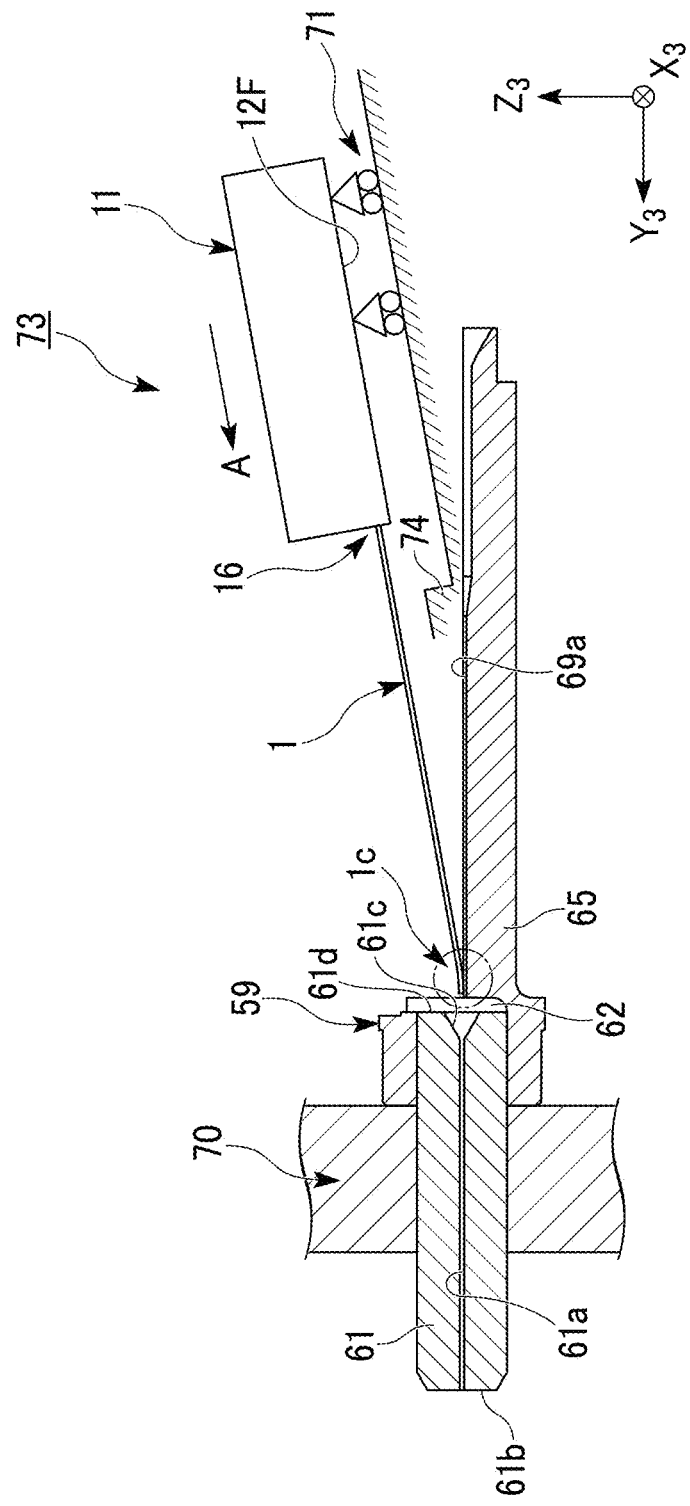
FIG. 11A is a diagram showing the optical fiber insertion device according to the first embodiment of the invention, and a schematic diagram a state where the optical fiber is brought into contact with an alignment groove.

FIG. 11A shows a state where the first end 1c of the first optical fiber 1 is brought into contact with the alignment groove 69a. In addition, FIG. 11B shows an enlarged view showing the first end 1c which comes into contact with the alignment groove 69a.

When the slider 71 is driven, the optical fiber holder 11 gradually comes close to the ferrule structure 59. Accordingly, the first end 1c of the first optical fiber 1 comes close to the alignment groove 69a of the ferrule structure 59, and eventually comes into contact therewith.

Figure 11B:
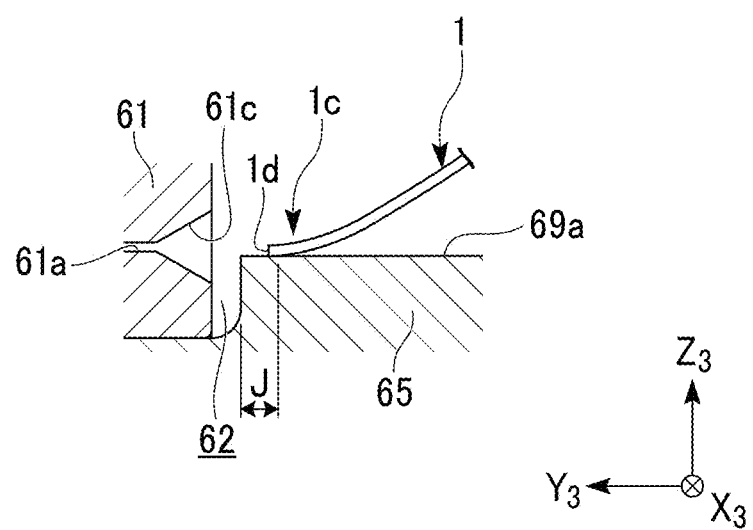
FIG. 11B is a diagram showing the optical fiber insertion device according to the first embodiment of the invention, and an enlarged view showing the contacted optical fiber.

As shown in FIG. 11B, the ferrule 61 is disposed at an interval 62 on the front ($+Y_3$ direction) of the alignment groove 69a. This interval 62 is secured for the purpose of preventing an adhesive overflowing when the first optical fiber 1 is inserted into the fiber hole 61a from being attached to the surroundings by storing the adhesive.

The first end 1c of the first optical fiber 1 is brought into contact with a position (position on the $-Y_3$ side) located on the alignment groove 69a and further inside by a distance J than the interval 62. That is, the first optical fiber 1 is not introduced directly into the fiber hole 61a. The first optical fiber temporarily comes into contact with the alignment groove 69a, and is introduced into the fiber hole 61a by curving the extending direction thereof.

Since the alignment groove 69a is a groove extending in the $Y_3$-axis direction, it is possible to prevent the first optical fiber 1 from shaking in a horizontal direction ($X_3$-axis direction) by bringing the first optical fiber into contact with the upper portion of the alignment groove 69a. Therefore, it is possible to prevent an overload from being applied to the first optical fiber 1 due to the first end 1c of the first optical fiber 1 deviating from the fiber hole 61a.

Figure 12A:
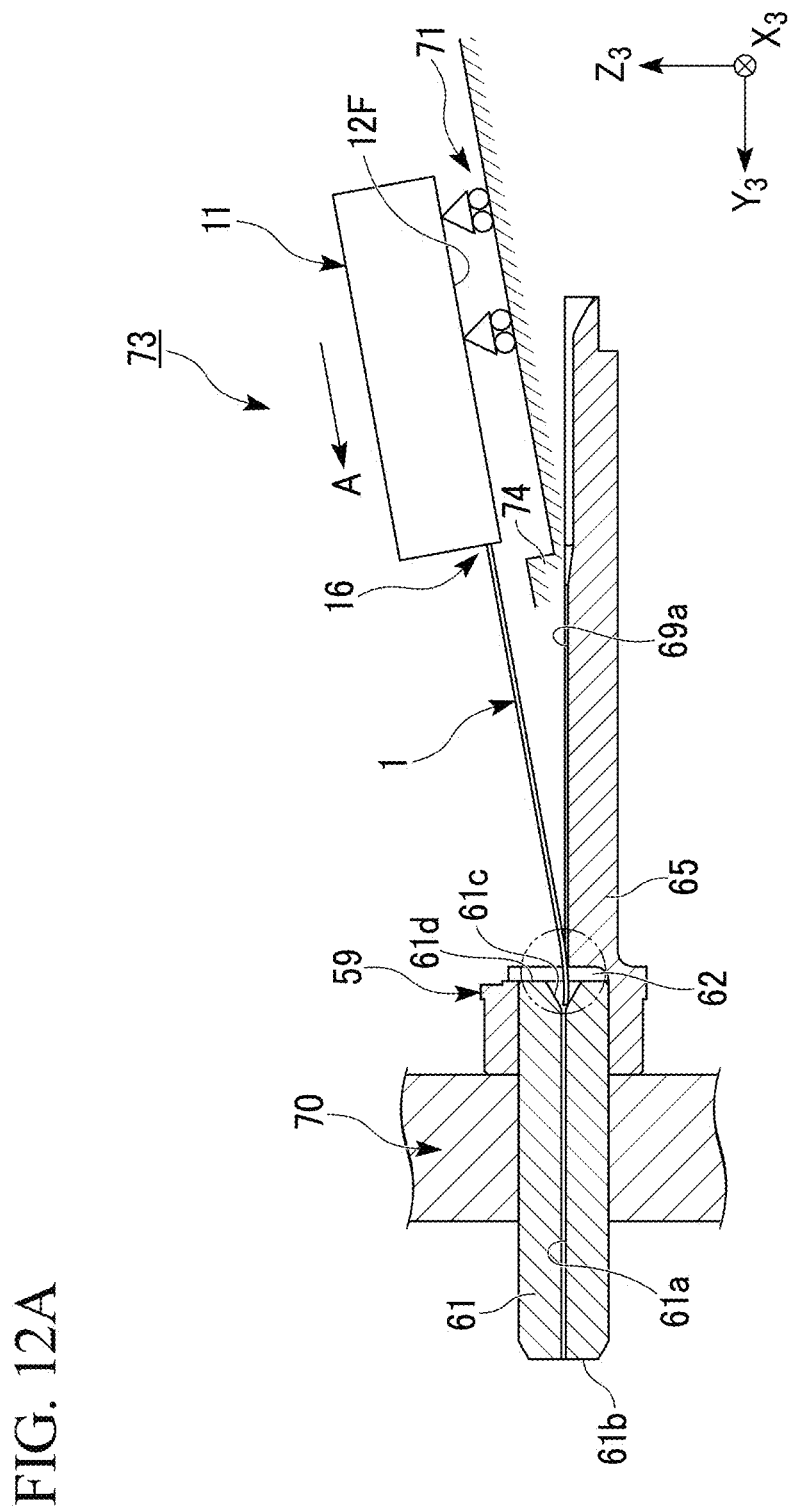
FIG. 12A is a diagram showing the optical fiber insertion device according to the first embodiment of the invention, and a schematic diagram of a state where the front end of the optical fiber is brought close to the inlet of the fiber hole.
Figure 12B:
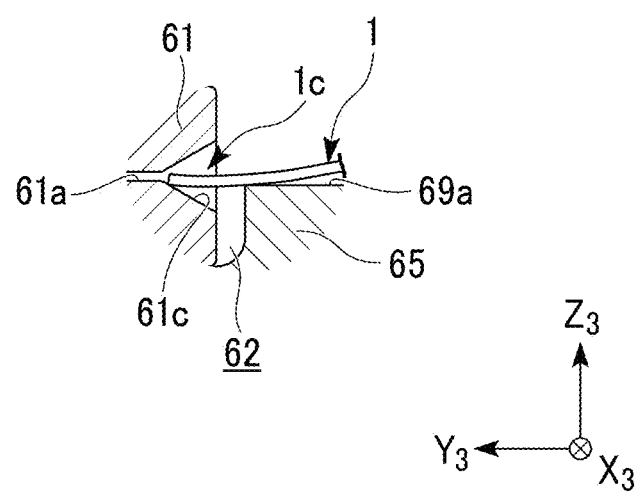
FIG. 12B is a diagram showing the optical fiber insertion device according to the first embodiment of the invention, and an enlarged view showing the front end of the optical fiber.

FIG. 12A shows a status immediately before the first end 1c of the first optical fiber 1 reaches the fiber hole 61a. In addition. FIG. 12B shows an enlarged view showing the first end 1c immediately before the first end reaches the fiber hole 61a.

A taper portion 61c having a funnel shape of which the inside diameter of the opening inlet of the fiber hole 61a is widened is formed on the rear end 61d side ($-Y_3$ side) of the fiber hole 61a. The taper portion 61c fulfills a function of introducing the first end 1c of the first optical fiber 1 into the fiber hole 61a and smoothing the insertion of the first optical fiber into the fiber hole 61a.

The first optical fiber 1 is curved on the alignment groove 69a by further forwarding the slider 71 in the direction of the arrow A from a state (state shown in FIGS. 11A and 11B) of contact with the alignment groove 69a, and the first end 1c faces the front end face 1d to the fiber hole 61a side. Thereby, the first end 1c can reliably come into contact with the taper portion 61c and be smoothly introduced into the fiber hole 61a.

Figure 13:
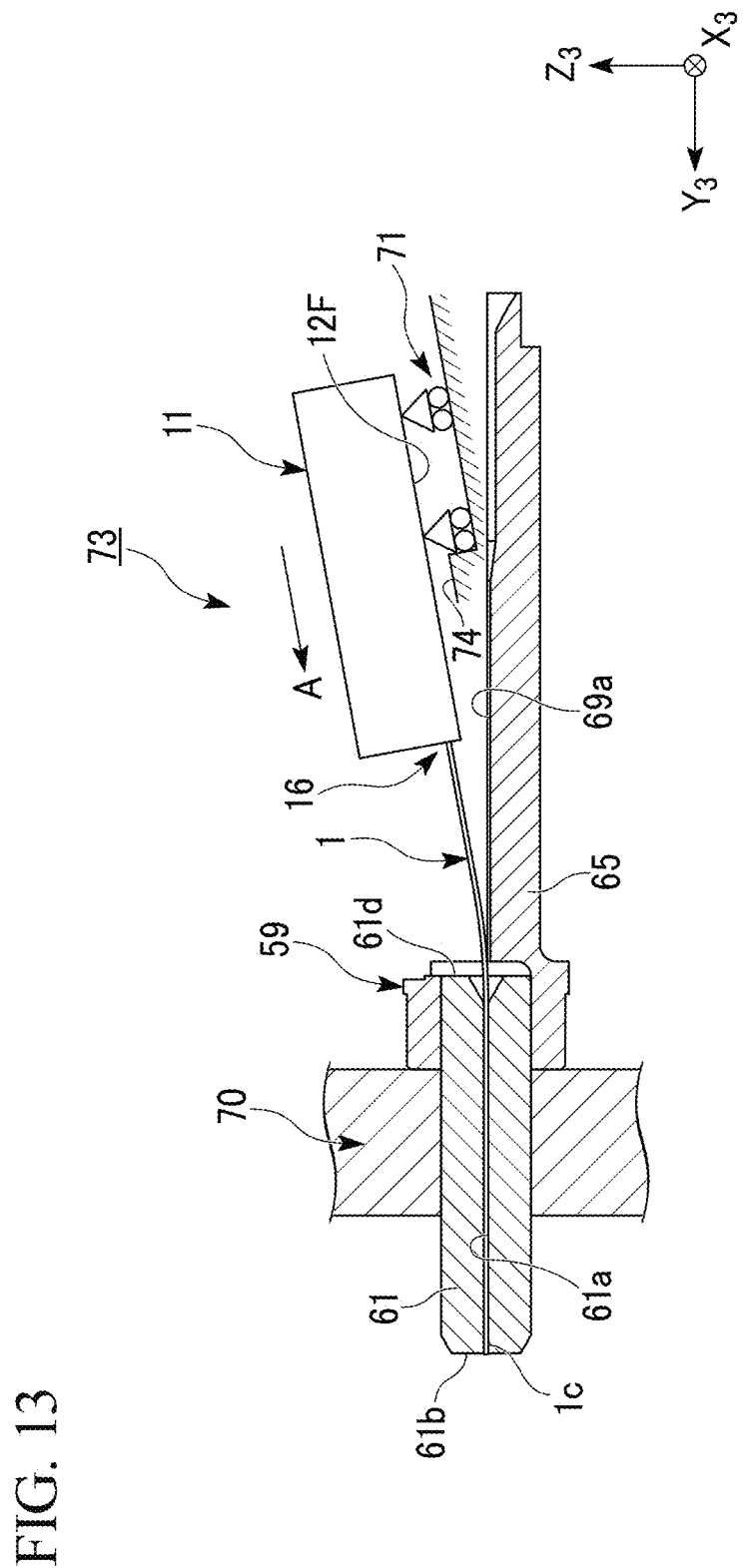
FIG. 13 is a diagram showing the optical fiber insertion device according to the first embodiment of the invention, and a schematic diagram of a state where the optical fiber is inserted into the fiber hole.

FIG. 13 shows a state where the first optical fiber 1 is inserted into the inside of the fiber hole 61a.

The first optical fiber 1 is inserted into the inside of the fiber hole 61a by further forwarding the slider 71 in the direction of the arrow A from a state (state shown in FIGS. 12A and 12B) of contact with the taper portion 61c. When the slider 71 is moved forward up to a predetermined position with the forward-movement limiter 74, the slider comes into contact with this forward-movement limiter 74, and thus is not able to be moved forward any more. The forward-movement limiter 74 is provided at a proper position in order to place the first optical fiber 1 at an appropriate insertion depth.

Figure 14A:
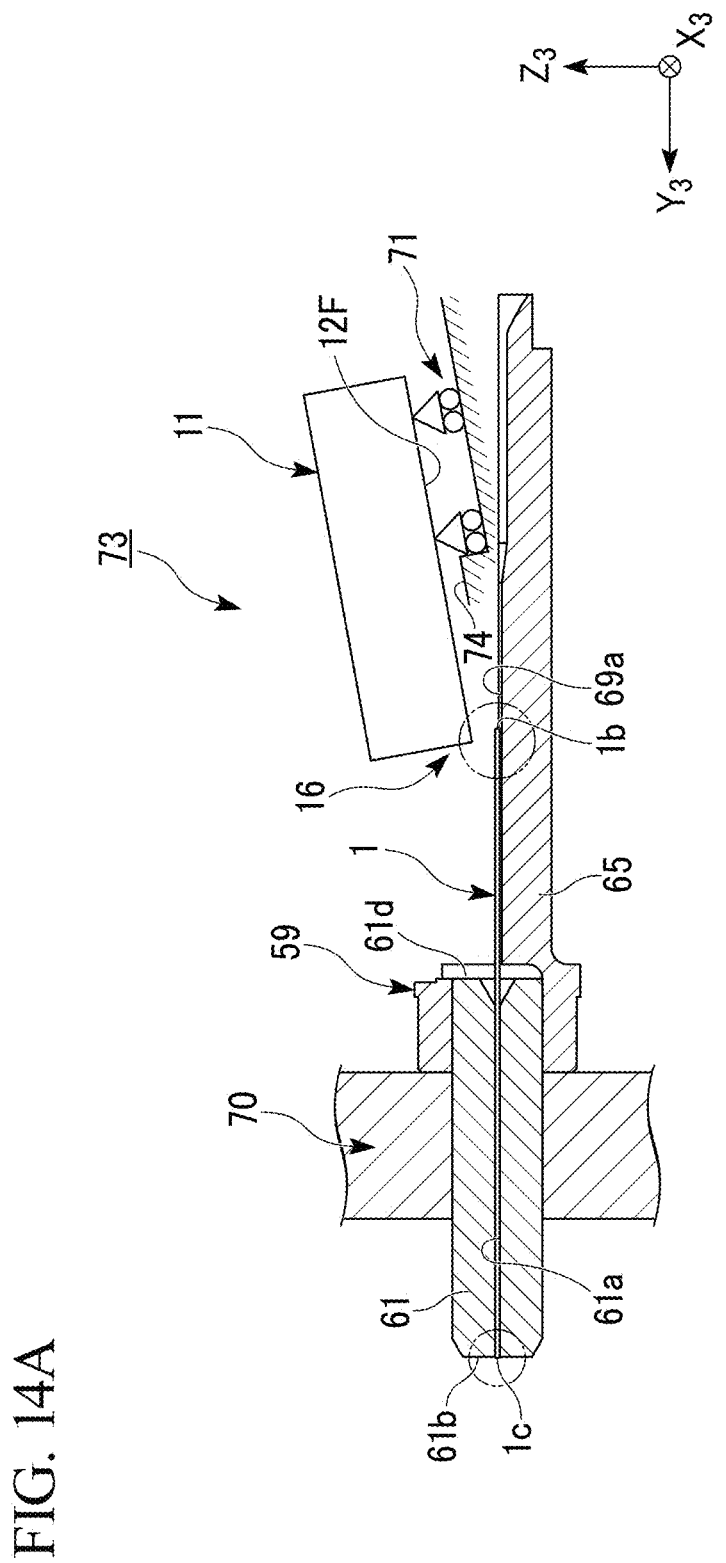
FIG. 14A is a diagram showing the optical fiber insertion device according to the first embodiment of the invention, and a schematic diagram of a state where the optical fiber is dropped onto the alignment groove.

FIG. 14A shows a state where the holding portion 16 of the optical fiber holder 11 is released.

After the slider 71 comes into contact with the forward-movement limiter 74, the holding portion 16 is set to be in the opened state by retreating the press member 13 of the optical fiber holder 11 and separating the second holding member 15 from the first holding member 14 (see FIG. 9A). Thereby, the second end 1a of the first optical fiber 1 drops from the holding portion 16, and thus can be disposed on the alignment groove 69a. The holding of the optical fiber holder 11 is released in the forward-movement limit determined by the forward-movement limiter 74, thereby allowing the second end 1a (rear end) of the first optical fiber 1 to be positioned in the alignment groove 69a.

A position at which the second end 1a drops can be set by the position of the forward-movement limiter 74 of the slider 71. The forward-movement limiter 74 is appropriately disposed, and thus it is not necessary to adjust the position of the end face 1b of the second end 1a after the second end 1a drops.

In the related art, after the first optical fiber 1 is inserted into the fiber hole 61a, the positioning of the end face 1b of the second end 1a placed in the alignment groove 69a has been performed.

An example of a positioning method includes a method of previously cutting off the first optical fiber 1 long, and holding the first optical fiber 1 protruding from the front end face 61b of the ferrule 61. However, in this method, there has been a concern that the refractive index-matching material layer 10 formed on the end face 1b drags the upper surface of the alignment groove 69a, and is peeled off from the end face 1b.

In addition, an example of another positioning method includes a method of disposing the second end 1a of the first optical fiber 1 at the rear with respect to a target position, and forwarding the first optical fiber 1 by pressing the end face 1b. In this method, there has been a concern that, since a force is applied to the end face 1b, a crack occurs in the refractive index-matching material layer 10 formed on the end face 1b. Additionally, there is the same problem as that of the positioning method in which the refractive index-matching material layer 10 drags the upper surface of the alignment groove 69a.

In a manufacturing method according to the present embodiment, positioning is completed at a point of time when holding in the holding portion 16 of the optical fiber holder 11 is released and the second end 1a of the first optical fiber 1 is dropped. Therefore, it is not necessary to perform positioning by which damage occurs in the refractive index-matching material layer 10.

A status of the second end 1a of the first optical fiber 1 in which the holding portion 16 is opened and holding is released will be described below. The optical fiber holder 11 is disposed so that the movable direction (see FIGS. 9A and 9B) of the second holding member 15 is coincident with the $X_3$-axis. When the press member 13 of the optical fiber holder 11 is brought into operation, and the holding portion 16 is opened, the second holding member 15 moves in the $X_3$-axis direction. Therefore, the second end 1a which is held drops naturally, and is placed on the alignment groove 69a as shown in FIG. 14C. That is, even when the holding portion 16 is opened, and the second end 1a is dropped, the refractive index-matching material layer 10 formed on the end face 1b of the second end 1a does not contact the holding portion 16.

In this manner, the capability to release holding in a state where the refractive index-matching material layer 10 does not contact the holding portion 16 is based on the following two configurations.

Firstly, as shown in FIG. 9C, the end face 1b of the second end 1a is disposed in the protective space 18 of the holding portion 16. Since the protective space 18 is formed so as to contain a trajectory in which the end face 1b is dropped, the refractive index-matching material layer 10 does not contact the holding portion 16 during the drop.

Secondly, the first holding member 14 and the second holding member 15 of the holding portion 16 are held from a direction orthogonal to a plane which is formed by the axis of the first optical fiber 1 and the axis of the fiber hole 61a. When holding is released in a configuration in which the holding in such a direction is performed, the second end 1a of the first optical fiber 1 drops naturally. Therefore, a procedure of sliding the second end 1a on the holding surface, or the like is not required, and the holding portion 16 does not contact the refractive index-matching material layer 10.

Figure 14B:
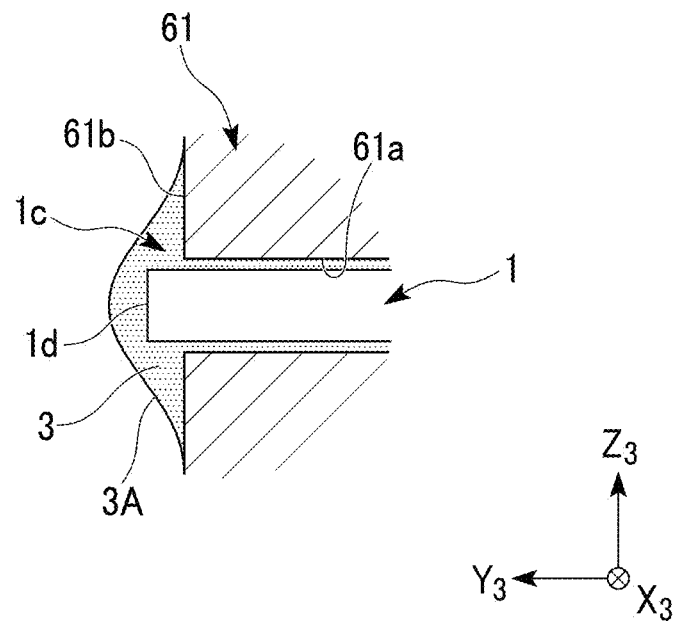
FIG. 14B is a diagram showing the optical fiber insertion device according to the first embodiment of the invention, and an enlarged view showing the front end of the optical fiber.
Figure 14C:
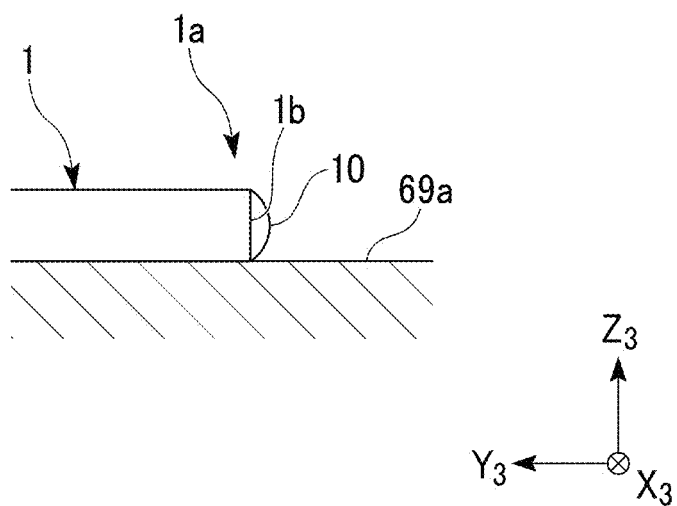
FIG. 14C is a diagram showing the optical fiber insertion device according to the first embodiment of the invention, and an enlarged view showing the rear end of the optical fiber.

FIG. 14B is a cross-sectional view showing a status of the front end face 61b of the ferrule 61 after the first optical fiber 1 is inserted. When the first optical fiber 1 is inserted into the fiber hole 61a from the rear end 61d of the ferrule 61 toward the front end 61b side, an adhesive 3 filled into the fiber hole 61a overflows from the front end of the fiber hole 61a, and a swelling portion 3A of the adhesive 3 is formed on the front end face 61b. A portion protruding from the first end 1c of the first optical fiber 1 and the front end face 61b of the ferrule 61 is contained in this swelling portion 3A.

The depth of the insertion of the first optical fiber 1 into the fiber hole 61a can be set by the position of the forward-movement limiter 74 that comes into contact with the slider 71 and regulates a forwarding movement (see FIG. 13). In addition, the first optical fiber 1 is cut off from the reference surface 16A of the holding portion 16 to the length of the distance H (see FIG. 9B). The position of the forward-movement limiter 74 and the length of the first optical fiber 1 are accurately set, and thus the first optical fiber 1 can be inserted so that the front end face 61b of the first optical fiber 1 is contained in the swelling portion 3A.

After the adhesive 3 is cured, the front end face 61b of the ferrule 61 is polished. The swelling portion 3A of the adhesive 3 is removed by this polishing process, and the front end face 61b of the first optical fiber 1 is polished and is set to be flush with the front end face 61b of the ferrule 61.

In this polishing process, a wrapping film using diamond or the like as polishing particles is used. In a case where the front end face 61b of the first optical fiber 1 protrudes from the swelling portion 3A, there may be a concern that the first optical fiber 1 which has protruded breaks down the wrapping film. Therefore, before the wrapping film is used, it is necessary to perform process of cutting off the first optical fiber 1 which has protruded, or preliminary polishing using sandpaper or the like. These processes can be omitted by causing the front end face 61b to be contained within the swelling portion 3A.

(Other Insertion Procedures)

As described above, the first optical fiber 1 may be manually inserted into the fiber hole 61a using a holding tool such as tweezers, except that the first optical fiber 1 is inserted into the fiber hole 61a using the optical fiber insertion device 73 including the optical fiber holder 11.

The holding tool is not limited to tweezers, and may be configured such that a first holding surface and a second holding surface for holding the second end 1a of the first optical fiber 1 through both sides thereof in a radial direction perform opening and closing. The first holding surface and the second holding surface may be processed in a shape appropriate to the holding of the first optical fiber 1. In addition, an elastic sheet is attached to the first holding surface and the second holding surface, and thus a load applied to the first optical fiber 1 may be reduced.

Hereinafter, a procedure of manually inserting the first optical fiber 1 into the fiber hole 61a will be described.

First, the ferrule structure 59 having an adhesive filled into the fiber hole 61a in advance is fixed to the ferrule-holding jig 70 (see FIG. 10 or the like). Further, a contact wall is installed on the front end 61b of the ferrule 61. This contact wall is provided in order to set the insertion depth of the first optical fiber 1 by bringing the wall into contact with the first end 1c of the first optical fiber 1 inserted into the fiber hole 61a.

Next, the first optical fiber 1 which is cut off to a predetermined length in advance and has the refractive index-matching material layer 10 formed on the end face 1b of the second end 1a is held by a holding tool. In this case, the holding tool holds a position apart from the end face 1b, and causes the first holding surface and the second holding surface of the holding tool not to come into contact with the refractive index-matching material layer 10.

Next, the first optical fiber 1 held by the holding tool is inserted into the fiber hole 61a from the first end 1c side. In this case, the first end 1c is inserted while the first end is brought into contact with the taper portion 61c formed on the rear end 61d of the fiber hole 61a. Thereby, the first optical fiber 1 can be smoothly introduced into the fiber hole 61a.

As described above, the front end 61b of the ferrule 61 is provided with the contact wall. When the first optical fiber 1 is inserted into the entirety of the fiber hole 61a, the first end 1c of the first optical fiber 1 comes into contact with the contact wall, and thus the insertion is not able to be performed any more.

After the first end 1c comes into contact with the contact wall, the holding of the first optical fiber 1 using the holding tool is released. Thereby, the second end 1a of the first optical fiber 1 drops, and thus can be disposed on the alignment groove 69a.

Since a position at which the second end 1a drops is uniquely determined by the contact of the contact wall with the first end 1c, it is not necessary to adjust the position of the end face 1b of the second end 1a after the second end 1a drops.

In this manner, the first optical fiber 1 may be manually inserted into the fiber hole 61a without using the optical fiber insertion device 73.

Second Embodiment

In a second embodiment, the same members as those in the first embodiment are denoted by the same reference numerals and signs, and thus the description thereof will be omitted or simplified.

Figure 25A:
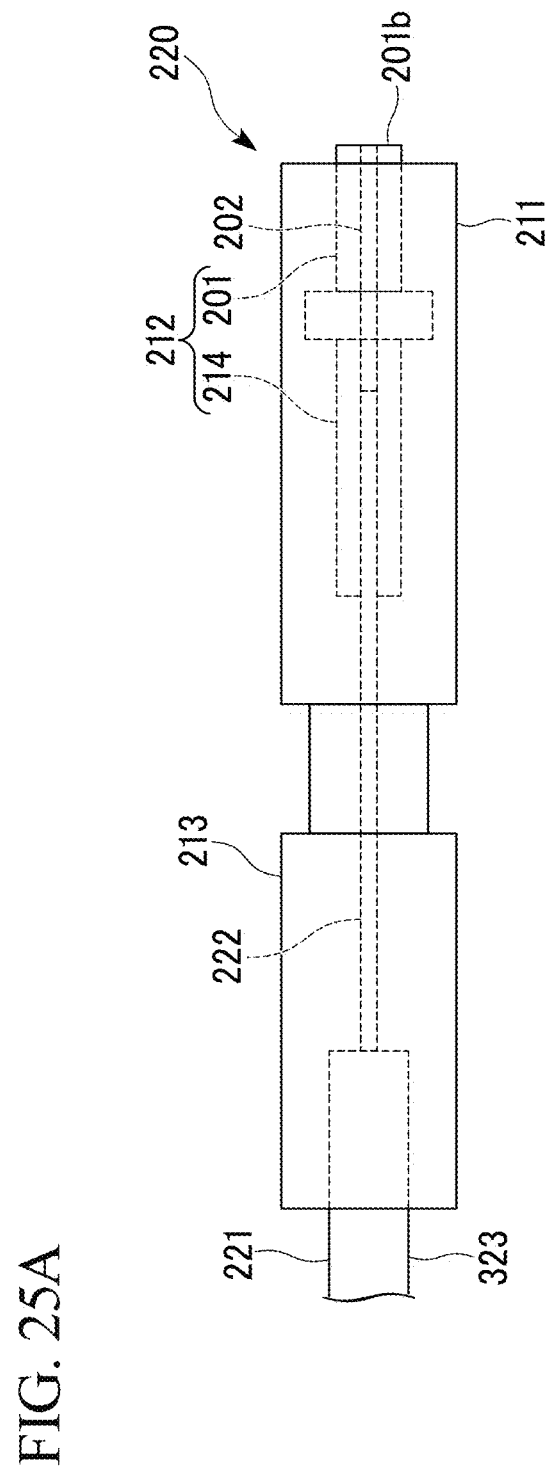
FIG. 25A is a schematic diagram showing the entire configuration of the optical connector capable of applying the connection method according to the second embodiment of the invention.
Figure 25B:
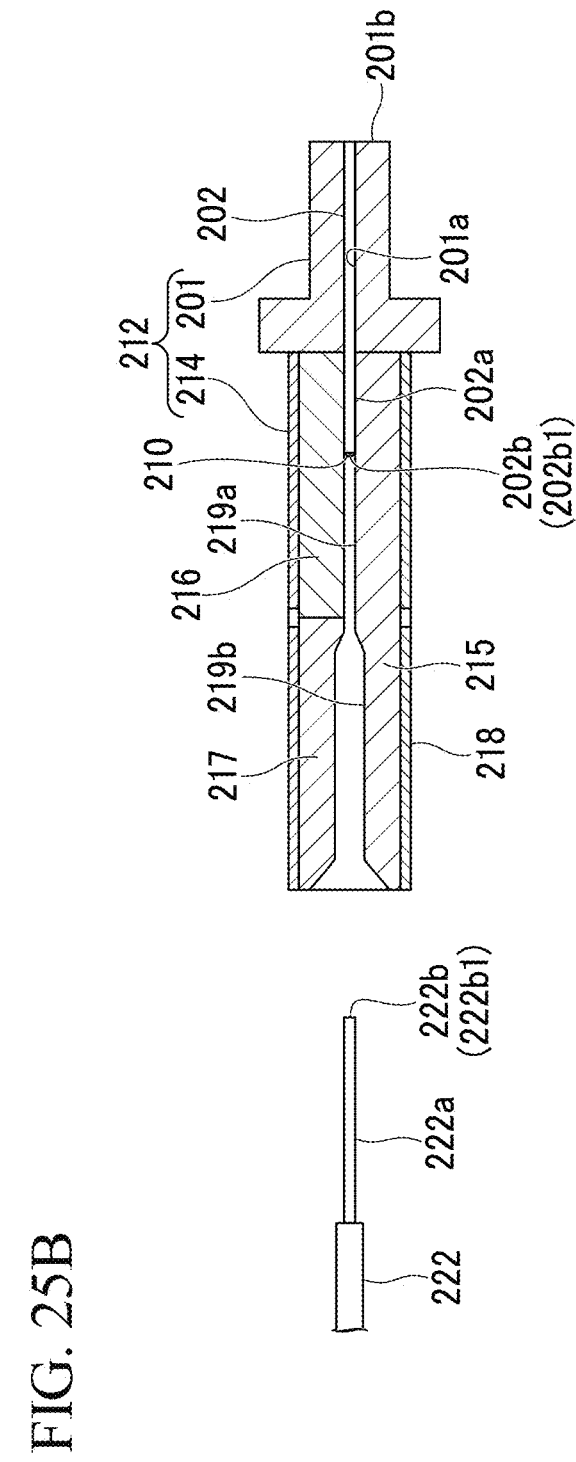
FIG. 25B is a schematic diagram showing a cross-section of a ferrule with a clamp of the optical connector shown in FIG. 25A.

FIGS. 25A and 25B are diagrams illustrating an optical connector 220 used in a method of connecting optical fibers according to the second embodiment of the invention.

As shown in FIG. 25A, the optical connector 220 is a field assembly-type optical connector, and is assembled to the terminal of an optical fiber cable 221.

The optical fiber cable 221 is configured such that, for example, an optical fiber 222 (second optical fiber, external optical fiber) and a linear tensile strength member (not shown) are collectively coated by an external coating 323. The optical fiber 222 is, for example, an optical fiber with a coating having a configuration in which a bare optical fiber 222a is covered with a coat, and can exemplify an optical fiber core, an optical fiber strand or the like.

The optical connector 220 is an optical fiber connector including a first housing 211 having a sleeve shape, a ferrule 212 with a clamp provided within the first housing 211, and a second housing 213 provided on the rear side of the first housing 211.

An example of the optical connector 220 capable of being used includes a single-core optical connector such as an SC-type optical connector (F04-type optical connector specified by JIS C5973; SC: Single fiber Coupling optical fiber connector), or an MU-type optical connector (F14-type optical connector specified by JIS C 5973; MU: Miniature-Unit coupling optical fiber connector).

In the following description, a direction toward a bonded end face 201b of a ferrule 201 may be referred to as a front (front end direction), and the opposite direction thereof may be referred to as a rear.

As shown in FIG. 25B, the ferrule 212 with a clamp is configured such that a clamp 214 (connection mechanism) is assembled on the rear side of the ferrule 201 to which an optical fiber 202 (built-in optical fiber 202, first optical fiber, receiving-side optical fiber) is inserted and fixed.

The clamp 214 holds and fixes a rear-side protruding portion 202a of the built-in optical fiber 202 and the front end of the optical fiber 222, and maintains a state of butt connection between the optical fibers 202 and 222.

The clamp 214 includes a base member 215 (rear-side extending piece 215)(base-side element) extending from the ferrule 201 to the rear side and lid members 216 and 217 (cover-side element), and a clamp spring 218 that collectively holds these members in the inside.

The clamp 214 can hold and fix the rear-side protruding portion 202a of the built-in optical fiber 202 and the front end of the optical fiber 222 with these components interposed between the base member 215 and the lid members 216 and 217.

The optical fiber 222, which is butt-connected to the rear end of the built-in optical fiber 202 of the ferrule 212 with a clamp, is also referred to as the inserted optical fiber 222.

The built-in optical fiber 202 is inserted into a fiber hole 201a which is a fine hole penetratingly provided in the ferrule 201 concentrically with its axis line, and is fixed to the ferrule 201 by adhesive fixation or the like using an adhesive. The end face of the front end of the built-in optical fiber 202 is exposed to the bonded end face 201b of the front end of the ferrule 201. The built-in optical fiber 202 is, for example, a bare optical fiber.

An alignment groove 219a that is used to position the rear-side protruding portion 202a of the built-in optical fiber 202 on the rear extension of the fiber hole 201a of the ferrule 201, and a coated portion receiving groove 219b extending to the rear from the rear end of the alignment groove 219a are formed on the opposite face (face opposite to the lid members 216 and 217) of the rear-side extending piece 215.

Figure 15:
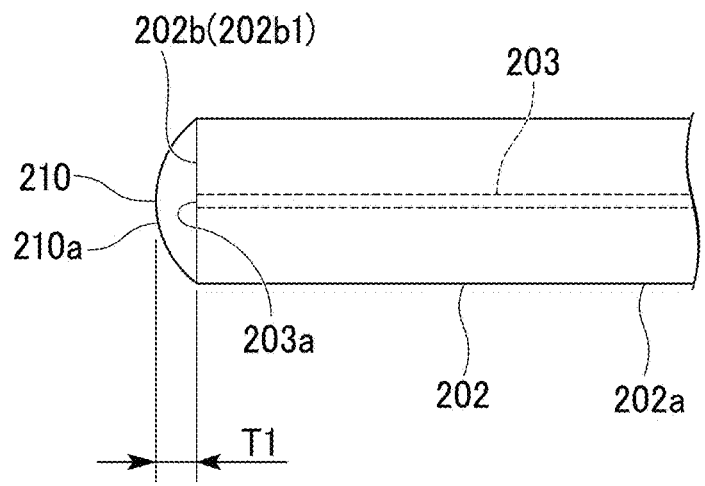
FIG. 15 is a side view showing a rear end of a built-in optical fiber which is used in an optical connector capable of applying a connection method according to a second embodiment of the invention.

FIG. 15 is a diagram showing a rear end 202b of the built-in optical fiber 202 and the periphery thereof. The rear end 202b is an end (connection end) located on the opposite side of the end (front end) of the ferrule 201 on the bonded end face 201b side. It is preferable that an end face 202b1 (rear end face, connection end face) of the rear end 202b be approximately flat, and be perpendicular to an optical axis.

It is preferable that the end face 202b1 be a mirror face. It is preferable that the maximum height Rz (JIS B 0601 (2001)) of the end face 202b1 be, for example, less than 1 µm.

A solid refractive index-matching material layer 210 is formed on the end face 202b1 of the built-in optical fiber 202. The refractive index-matching material layer 210 is formed so as to be interposed between the end face 202b1 of the built-in optical fiber 202 and an end face 222b1 (front end face) (see FIG. 16) of the inserted optical fiber 222.

The refractive index-matching material layer 210 has a refractive index-matching property. The refractive index-matching property refers to the degree of proximity between the refractive index of the refractive index-matching material layer 210 and the refractive index of the optical fibers 202 and 222. The refractive index of the refractive index-matching material layer 210 may as well closer to those of the optical fibers 202 and 222. However, from the point of a reduction in transmission loss due to the avoidance of Fresnel reflection, the difference between the refractive indexes of the optical fibers 202 and 222 is preferably within ±0.1, and is more preferably within ±0.05. In a case where the refractive indexes of the two optical fibers 202 and 222 which are butt-connected to each other are different from each other, the difference between the average value of the refractive indexes of the two optical fibers 202 and 222 and the refractive index of the refractive index-matching material layer 210 is preferably within the above range.

Examples of materials of the refractive index-matching material layer 210 include high-polymer materials such as acryl series, epoxy series, vinyl series, silicone series, rubber series, urethane series, methacryl series, nylon series, bisphenol series, diol series, polyimide series, fluorinated epoxy series, or fluorinated alkyl series.

The refractive index-matching material layer 210 may be formed in a layer shape having a constant thickness, but is preferably formed in a shape having a thickness gradually decreasing from the center of the end face 202b1 toward the circumferential edge.

For example, a rear face 210a (external face) of the refractive index-matching material layer 210 can be formed to be a curved-convex face protruding to the rear (connection direction). The curved-convex face is, for example, a spherical face, an elliptic spherical face or the like. The entirety of the rear face 210a may be a curved-convex face, and only a portion thereof may be a curved-convex face.

The rear face 210a is formed to be a curved-convex face, and thus the central portion of the end face 222b1 becomes thickest. Therefore, an end face 223a of a core 223 located on the center of the end face 222b1 is reliably brought into contact with the refractive index-matching material layer 210, thereby allowing a connection loss to be reduced satisfactorily.

The refractive index-matching material layer 210 is preferably formed so as to cover at least an end face 203a of a core 203 in the end face 202b1, and is more preferably formed on the entirety of the end face 202b1. The refractive index-matching material layer 210 in the shown example is formed on the entirety of the end face 202b1.

The refractive index-matching material layer 210 may be formed so as to reach not only the end face 202b1, but also the outer circumferential face of the built-in optical fiber 202 in the periphery of the rear end 202b.

The refractive index-matching material layer 210 can be elastically deformed. The refractive index-matching material layer 210 is a soft layer of the optical fibers 202 and 222 which has lower hardness than that of a bare optical fiber. When the inserted optical fiber 222 is butt-jointed to the built-in optical fiber 202, the refractive index-matching material layer can alleviate an impulsive force due to the butting.

Figure 28:
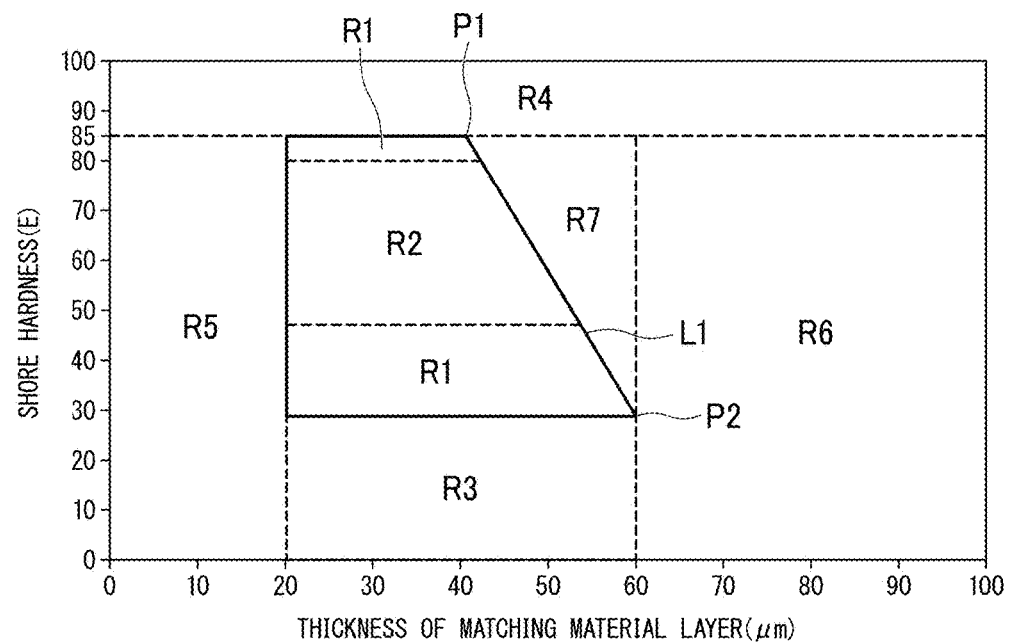
FIG. 28 is a diagram showing a preferred range of the physical properties of a refractive index-matching material which is used in the connection method according to the second embodiment of the invention.

As shown in FIG. 28, it is preferable that the Shore hardness E (based on JIS K 6253) of the refractive index-matching material layer 210 be equal to or greater than 30 and equal to or less than 85.

In a case where the Shore hardness E of the refractive index-matching material layer 210 is excessively low (in, for example, a region R3), the refractive index-matching material layer 210 has a tendency to be peeled off from the end face 202b1 of the built-in optical fiber 202, but the Shore hardness E is set to be equal to or greater than 30, thereby allowing this peeling-off to be prevented from occurring.

Specifically, even in a case where a large force is applied to the refractive index-matching material layer 210 due to, for example, the positioning of the ends of the optical fibers 202 and 222, or a fluctuation in temperature or humidity within the alignment groove 219a, it is possible to prevent the refractive index-matching material layer 210 from being peeled off from the end face 202b1.

In addition, the Shore hardness E of the refractive index-matching material layer 210 is set to be equal to or greater than 30, and thus it is possible to prevent deformation such as wrinkle formation causing a loss increase from occurring in the refractive index-matching material layer 210.

In a case where the Shore hardness E of the refractive index-matching material layer 210 is excessively high (in, for example, a region R4), the viscosity of a refractive index-matching material when uncured becomes higher, and thus it is difficult to attach the built-in optical fiber 202 to the end face 202b1. However, the Shore hardness E is set to be equal to or less than 85, and thus an operation for attaching the refractive index-matching material to the end face 202b1 is facilitated, thereby allowing the refractive index-matching material layer 210 having a predetermined shape (for example, shape forming the aforementioned curved-convex face) to be accurately formed.

In addition, the Shore hardness E of the refractive index-matching material layer 210 is set to be equal to or less than 85, and thus sufficient follow-up deformation can be performed on the ends of the optical fibers 202 and 222. Therefore, even in a case where a large force is applied to the refractive index-matching material layer 210 due to, for example, the positioning of the ends of the optical fibers 202 and 222, or a fluctuation in temperature or humidity within the alignment groove 219a, it is possible to avoid the occurrence of a gap or the like causing a loss increase.

It is preferable that the thickness (for example, thickness T1 shown in FIG. 15) of the refractive index-matching material layer 210 be larger than 10 µm. Particularly, it is preferable that the thickness be equal to or greater than 20 µm and equal to or less than 60 µm.

The thickness of the refractive index-matching material layer 210 is, for example, the thickness of the core 203 on the center of the end face 203a, and is the dimension of the built-in optical fiber 202 in an optical axis direction. The thickness T1 shown in FIG. 15 is the thickness of the central portion of the refractive index-matching material layer 210, and is a maximum thickness.

As shown in FIG. 28, in a case where the refractive index-matching material layer 210 is excessively thin (in, for example, a region R5), it is not possible to exhibit an effect as a refractive index-matching material when a distance between the optical fibers 202 and 222 increases. However, in a case where the thickness is set to be equal to or greater than 20 µm, it is possible to reliably obtain the effect as a refractive index-matching material, which is advantageous.

In addition, the thickness is set to be equal to or greater than 20 µm, and thus sufficient follow-up deformation can be on the ends of the optical fibers 202 and 222. Thereby, it is possible to avoid the occurrence of a gap or the like causing a loss increase.

In a case where the refractive index-matching material layer 210 is excessively thick (in, for example, a region R6), the positions of the ends of the optical fibers 202 and 222 are not stabilized, and thus initial characteristics have a tendency to fluctuate.

In addition, the stability of the optical fiber end position is influenced by the hardness of the refractive index-matching material layer 210.

When a straight line that links a point P1 of the Shore hardness E85 and thickness 40 µm and a point P2 of Shore hardness E30 and thickness 60 µm is set to a straight line L1 (Shore hardness E=−2.75*matching material layer thickness+195), the end positions of the optical fibers described above is not likely to be destabilized in a region (such as the region R1) on a side which is smaller in thickness than that of the straight line L1, inclusive of the straight line, as compared to a region (such as a region R7) on a side which is larger in thickness than that of the straight line L1.

Thus, in a region (region R1) in which the Shore hardness E of the refractive index-matching material layer 210 is equal to or greater than 30 and equal to or less than 85, the thickness thereof is equal to or greater than 20 µm and equal to or less than 60 µm, and the region R7 is excluded, that is, a range (trapezoidal range of FIG. 28) surrounded by (Shore hardness E; 30, thickness; 20 µm), (Shore hardness E; 85, thickness; 20 µm), (Shore hardness E; 85, thickness; 40 µm), and (Shore hardness E: 30, thickness: 60 µm), it is possible to prevent the refractive index-matching material layer 210 from being peeled off, and to accurately form the refractive index-matching material layer 210. Further, initial characteristics are stabilized, and thus it is possible to reliably keep a connection loss low.

In a case where the inserted optical fiber 222 is a holey fiber (see FIG. 29) within the region R1, and in the region R2 in which the Shore hardness E is equal to or greater than 45 and equal to or less than 80, it is possible to reduce a connection loss.

The holey fiber is an optical fiber having a plurality of holes continuous in a waveguide direction. An example of the holey fiber (HF) includes a hole-assisted fiber (HAF) or the like.

The reason for being capable of reducing a connection loss satisfactorily due to the use of the refractive index-matching material layer 210 in the region R2 can be considered as follows.

Figure 29:
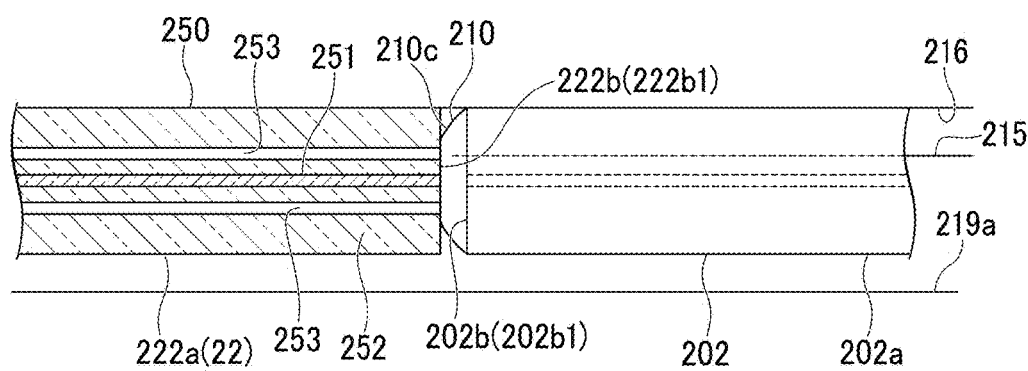
FIG. 29 is a partially cross-sectional view showing a connection portion between an inserted optical fiber which is a holey fiber and a built-in optical fiber.

As shown in FIG. 29, a holey fiber 250 includes a core 271 and a cladding portion 252 surrounding its periphery, and has a plurality of holes 253 formed within the cladding portion 252.

Figure 30:
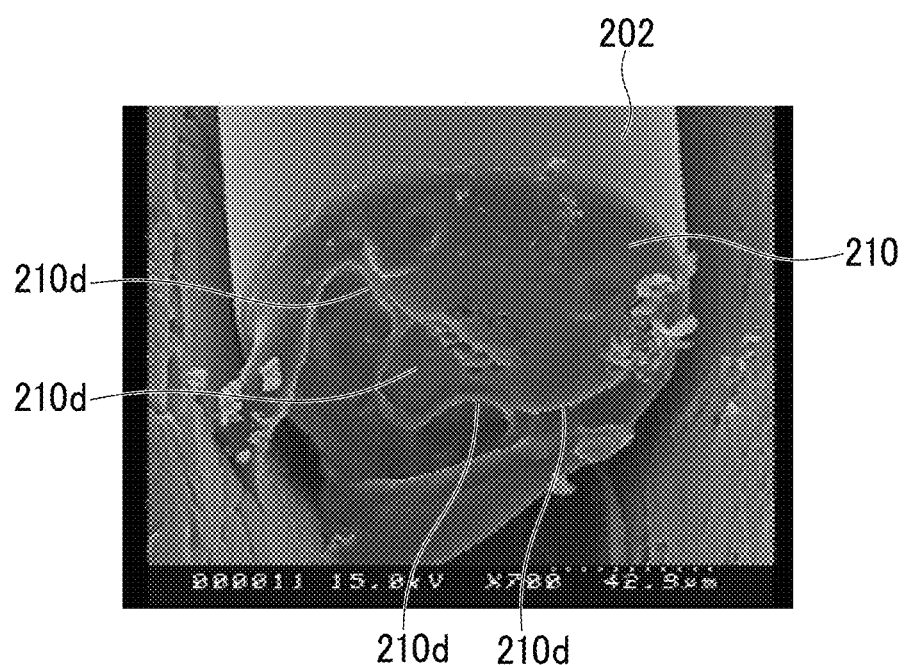
FIG. 30 is a photograph illustrating a refractive index-matching material layer in a case where a connection loss increases when the holey fiber is used.

FIG. 30 is a photograph illustrating the refractive index-matching material layer 210 in a case where a connection loss increases using a solid refractive index-matching material in the holey fiber 250. The surface of the refractive index-matching material layer 210 is not flat, and a stepped portion 210d caused by irregularities is formed. When seen from its shape, the stepped portion 210d has a possibility to be formed by the occurrence of wrinkled deformation in the surface of the refractive index-matching material layer 210 due to a force applied to the refractive index-matching material layer 210 by the optical fibers 202 and 222.

From this, the following presumption can be made.

In a case where the inserted optical fiber 222 is the holey fiber 250, the surface of the refractive index-matching material layer 210 is formed in a shape having irregularities depending on the end face 222b1 having the holes 253 due to butting to the built-in optical fiber 202. Thereby, the refractive index-matching material layer 210 is not likely to slidably move in the plane direction with respect to the end face 222b1.

In a case where the hardness of the refractive index-matching material layer 210 is excessively low, an interposition piece 231 is removed in this state. When the optical fibers 202 and 222 are positioned with the alignment groove 219a due to the elasticity of the clamp spring 218, a large shearing force in the plane direction is applied to the refractive index-matching material layer 210 by the end face 222b1 of the inserted optical fiber 222, and thus there may be a concern of the occurrence of deformation such as wrinkle formation causing a loss increase.

On the other hand, in a case where the hardness of the refractive index-matching material layer 210 is excessively high, there may cause concern that sufficient follow-up deformation cannot be made during the positioning of the optical fiber end within the alignment groove 219a, and that a gap or the like causing a loss increase occurs.

In contrast, in a case where the refractive index-matching material layer 210 in the region R2 (the Shore hardness E is equal to or greater than 45 and equal to or less than 80) is used, sufficient follow-up deformation can be made with respect to the optical fiber end to be positioned. Thereby, a gap or the like causing a loss increase does not occur, and deformation such as wrinkle formation is not likely to occur. Therefore, it is possible to reduce a connection loss.

The refractive index-matching material layer 210 can be formed by, for example, the following method.

In a state where the built-in optical fiber 202 is electrically charged, the end face 202b1 of the rear end 202b is brought close to the liquid level of a liquid refractive index-matching material, and this liquid refractive index-matching material is adsorbed (attached) to the end face 202b1 of the built-in optical fiber 202 and then is cured, to form the refractive index-matching material layer 210.

In addition, the end face 202b1 may be cleaned using electrical discharge, in advance of the formation of the refractive index-matching material layer 210.

The refractive index-matching material layer 210 can also be formed by applying the liquid refractive index-matching material to the end face 202b1, using other methods, without being limited to a method of electrically adsorbing the liquid refractive index-matching material.

Figure 26:
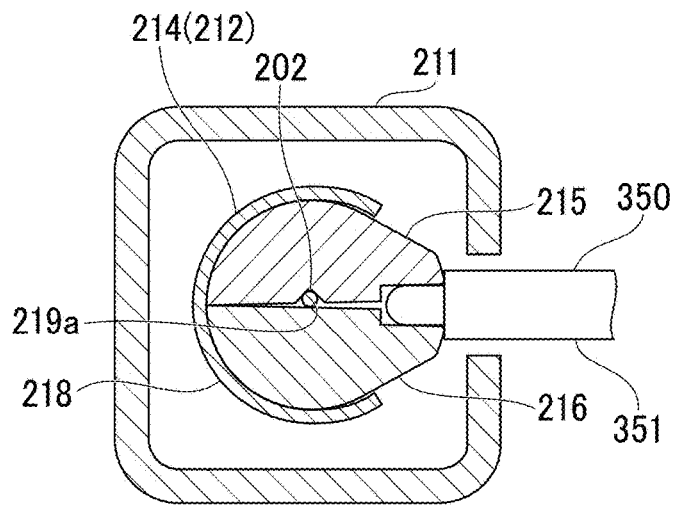
FIG. 26 is a cross-sectional view showing a relationship between the ferrule with a clamp of the previous drawing and an interposition piece.

As shown in FIG. 26, an interposition piece 351 of a splicing tool 350 can be removably interposed between the rear-side extending piece 215 and the lid members 216 and 217.

As shown in FIG. 25A, the second housing 213 can be configured to be capable of anchoring the terminal of the optical fiber cable 221.

Next, the second embodiment of a method of connecting optical fibers using the optical connector 220 will be described in detail.

(Cutting of Optical Fiber)

First, the inserted optical fiber 222 is cut.

Figure 16:
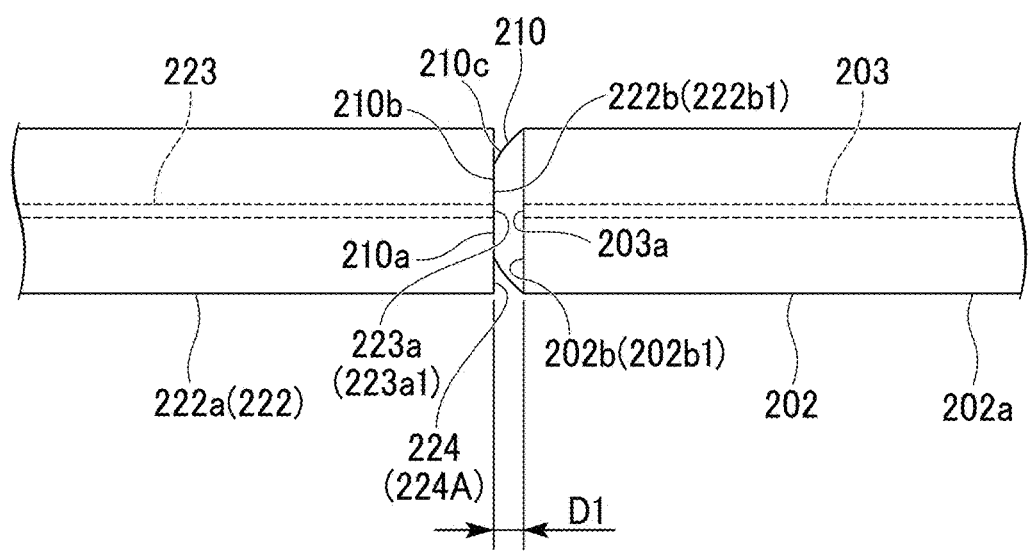
FIG. 16 is a side view showing a connection portion between the built-in optical fiber of FIG. 15 and an example of an inserted optical fiber.

The cutting of the optical fiber 222 is a process of adjusting the lead-out length of the optical fiber 222 to a length determined according to the specification of the optical connector 220, and forming the end face 222b1 which is a mirror face (see FIG. 16).

When the optical fiber 222 is cut off, an initial crack is formed in the optical fiber 222 by a cutting blade, and then the inserted optical fiber 222 is cut off by a cleavage by giving a tensile force to the inserted optical fiber 222 so as to grow this initial crack.

As a cutting tool (optical fiber cutter) of the optical fiber, a simple tool can be used.

An example of the simple-type optical fiber cutter includes a cutter for manually performing the driving of a cutting blade or the application of a tensile force to the inserted optical fiber 222.

A specific example of the simple-type optical fiber cutter includes, for example, an optical fiber cutter which is provided with a holding portion that holds an optical fiber, a pair of arms extending out therefrom, and holding portions provided on the front ends of the arms (see, for example, Japanese Unexamined Patent Application, First Publication No. 2012-226252, Japanese Patent Application No. 2013-141144 (Japanese Unexamined Patent Application, First Publication No. 2014-211608)).

The optical fiber cutter promotes the cutting of the optical fiber by manually forming an initial crack in the optical fiber using a cutting blade, and applying a tensile force to the optical fiber so that an operator operates the holding portion using a finger and interposes the optical fiber.

In the optical fiber cutter exemplified herein, a method of causing a tensile force to act by drawing out the optical fiber in a length direction may be adopted, but a method of causing a tensile force to act by applying a force in a bending direction to the optical fiber may be adopted.

In the simple-type optical fiber cutter, it is difficult to keep the conditions of cutting completely constant. Particularly, it is difficult to accurately adjust the depth of an initial crack formed in the optical fiber, and a tensile force applied to the optical fiber.

The reason for the difficulty in adjusting the depth of an initial crack is that it is not easy to keep the traveling speed, cutting position or the like of the cutting blade constant, in terms of a device structure. For example, in a case where the cutting blade is manually driven, it is not easy to accurately set the conditions of the traveling speed, cutting position or the like of the cutting blade.

The reason for the difficulty in adjusting a tensile force is that the holding position of the optical fiber has a tendency to fluctuate, and that it is not easy to keep a force applied to the optical fiber constant, in terms of a device structure. For example, in a case where the application of tensile force is manually performed, it is difficult to adjust a high-accuracy tensile force.

In a case where the depth of the initial crack is, for example, insufficient (in a case where a crack is shallow), a break (crack formation) has a tendency to progress faster than the growth of the initial crack, and thus it can be presumed that irregularities (for example, hackle marks (described later)) have a tendency to be formed on a cutting face.

In a case where the tensile force is, for example, excessive, a break (crack formation) has a tendency to progress faster than the growth of the initial crack, and thus it can be presumed that irregularities have a tendency to be formed on the cutting face.

In a case where the simple-type optical fiber cutter is used, it is difficult to accurately adjust the depth of the initial crack, a tensile force applied to the optical fiber, or the like, and thus an entirely specular cutting face may not be obtained.

The end face of an external optical fiber, which is a target for the connection method of the invention, falls under any of the following two cases.

Case 1: the protrusion height of a protruding portion protruding from a reference surface is less than 10 μm, and a core is included in a non-mirror portion.

Case 2: the protrusion height of the protruding portion is equal to or greater than 10 μm and equal to or less than the thickness of the refractive index-matching material layer.

The mirror face is, for example, a face of which the maximum height Rz (JIS B 0601(2001)) is less than 1 μm. Light transmittance (transmittance of light used in the optical connector 220) on the end face 223a of the core 223 which is a mirror face is, for example, equal to or greater than 95% (preferably equal to or greater than 99%), and light transmittance on the end face 223a of the core 223 which is a "non-mirror face" is, for example, value out of this range.

Hereinafter, each case will be described.

(Case 1)

Case 1 is a case where the protrusion height of the protruding portion on the end face (cutting face) of the inserted optical fiber is less than 10 μm, and a core is included in the non-mirror portion.

Micro irregularities such as, for example, hackle marks may be formed on the end face 222b1 of the inserted optical fiber 222. The hackle marks are streaky irregularities which are formed along the traveling direction of the cutting of the optical fiber, and are formed with the parallel progress of a plurality of fracture formations, for example, when a large force (such as a tensile force) is applied to the optical fiber during the cutting of the optical fiber.

Figure 17A:
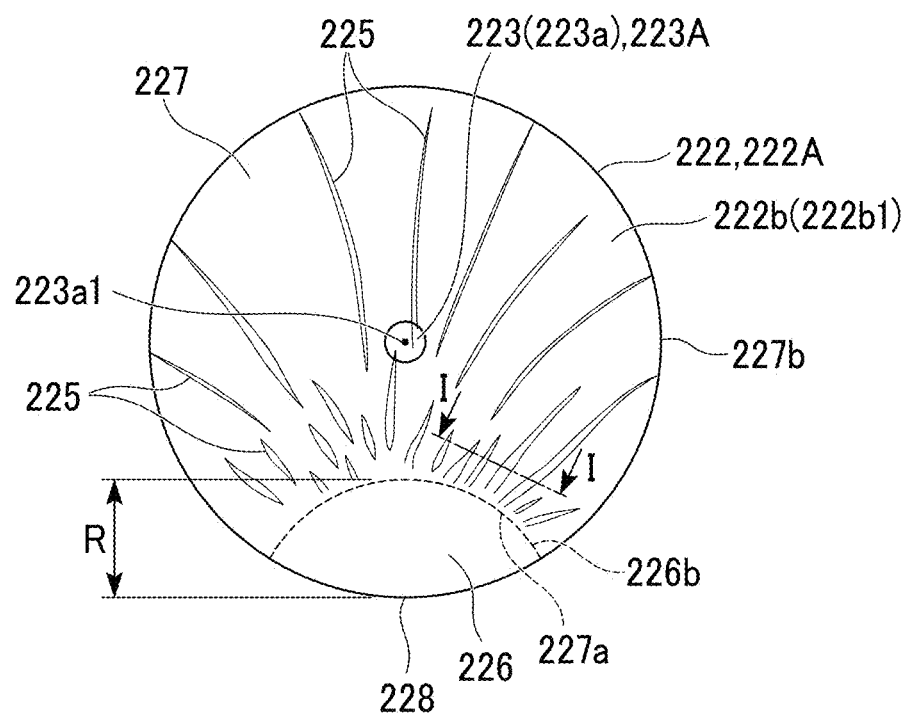
FIG. 17A is a diagram showing an example of a front end face of the inserted optical fiber.
Figure 17B:
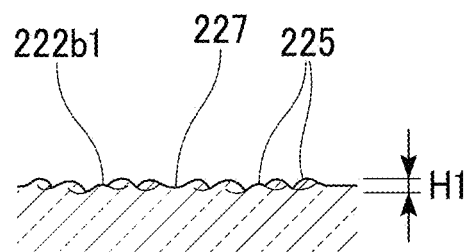
FIG. 17B is a diagram schematically illustrating a cross-section taken along line I-I shown in FIG. 17A.

FIGS. 17A and 17B are diagrams illustrating a first example of Case 1. FIG. 17A is a plan view showing the end face 222b1 of the inserted optical fiber 222(222A) in this example. FIG. 17B is a diagram schematically illustrating a cross-section of hackle marks 225, and is a diagram schematically illustrating a cross-section taken along line I-I of FIG. 17A.

In this example, the end face 222b1 is a face perpendicular to the optical axis of the inserted optical fiber 222, and is an approximately flat face (see FIG. 16). The approximately flat face refers to, for example, a face having no portion (protrusion height equal to or greater than 10 μm) (see FIG. 20) protruding from a face (main face) including the end face 223a of the core 223. The maximum height Rz (JIS B 0601(2001)) of the "approximately flat face" may be specified to be less than 10 μm.

As shown in FIG. 17A, the end face 222b1 in this example has a mirror face region 226 including a start point 228 of the initial crack, and a hackle mark region 227 (non-mirror portion) which is a region located outside the mirror face region 226. The hackle mark region 227 is a region having one or a plurality of hackle marks 225.

As shown in FIG. 17B, the hackle marks 225 are micro irregularities formed on the end face 222b1. The height H1 of the protruding portion of the hackle marks 225 may be, for example, equal to or greater than 1 μm and less than 10 μm.

The height H1 may be the maximum difference in height of irregularities within a predetermined region in the hackle mark region 227.

The maximum height Rz (JIS B 0601(2001)) of the term "irregularities (micro irregularities)" as used herein can be specified to be in the range (equal to or greater than 1 μm and less than 10 μm).

The term "height" as used herein refers to a direction perpendicular to the end face 222b1, that is, a dimension in an optical axis direction.

As shown in FIG. 17A, the hackle marks 225 are, for example, formed so as to radially extend from an inner edge 227a of the hackle mark region 227 toward an outer edge 227b (outer circumferential edge of the end face 222b1). The hackle marks 225 in this example are formed in a radial shape using the start point 228 of the initial crack or the periphery of thereof as an intensive point.

In this example, the end face 223a of the core 223(223A) is configured such that the entirety thereof is included in the hackle mark region 227, and thus is a "non-mirror face".

The end face 222b1 shown in FIG. 17A has no protruding portion having a protrusion height of 10 μm or greater, and thus is included in "the protrusion height of the protruding portion is less than 10 μm". The protruding portion refers to a portion protruding from the reference surface to the built-in optical fiber 202 side. The reference surface refers to a face (for example, face including the center of the end face of a core) which is parallel to the end face of the connection end of the receiving-side optical fiber and includes a core of an external optical fiber.

As shown in FIG. 16, in this example, since the end face 202b1 is a face perpendicular to the optical axis of the built-in optical fiber 202, and the end face 222b1 is a face perpendicular to the optical axis of the inserted optical fiber 222, the end face 222b1 is parallel to the end face 202b1. In addition, the end face 222b1 includes the end face 223a of the core 223 (specifically, includes a center 223a1 of the core 223). Thus, the end face 222b1 is a reference surface 224(224A) in the inserted optical fiber 222.

The end face 222b1 is an approximately flat face, and has no protruding portion having a height of 10 μm or greater which protrudes from the reference surface 224(224A).

Figure 18:
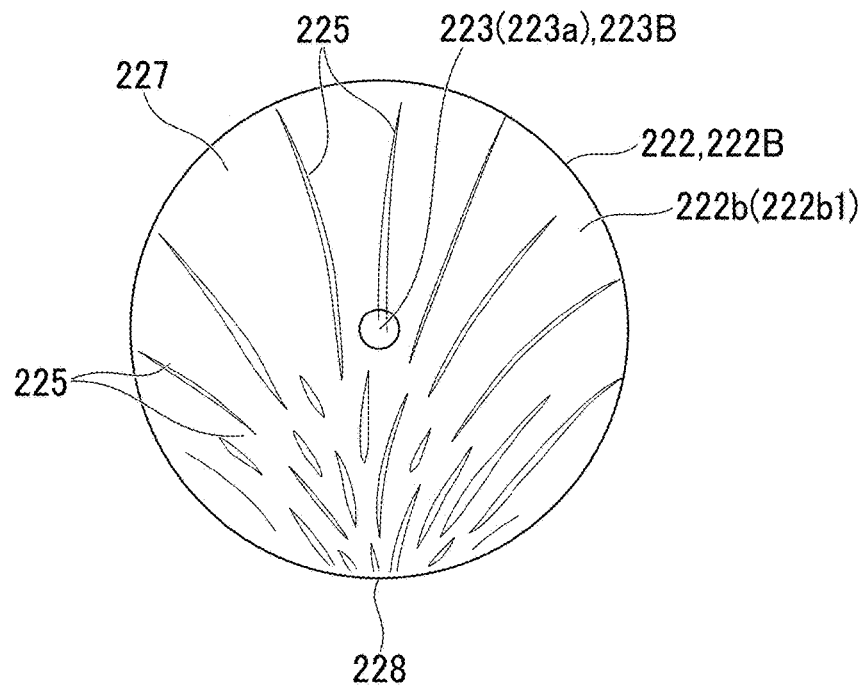
FIG. 18 is a diagram showing another example of the front end face of the inserted optical fiber.

FIG. 18 shows a second example of Case 1. In the inserted optical fiber 222(222B) in this example, the mirror face region 226 is not present, and the entirety of the end face 222b1 serves as the hackle mark region 227. The end face 223a of the core 223(223B) is included in the hackle mark region 227, and thus is a "non-mirror face".

Similarly to the case of FIGS. 17A and 17B, the end face 222b1 has no protruding portion having a height of 10 μm or greater protruding from the reference surface 224(224A).

Figure 19:
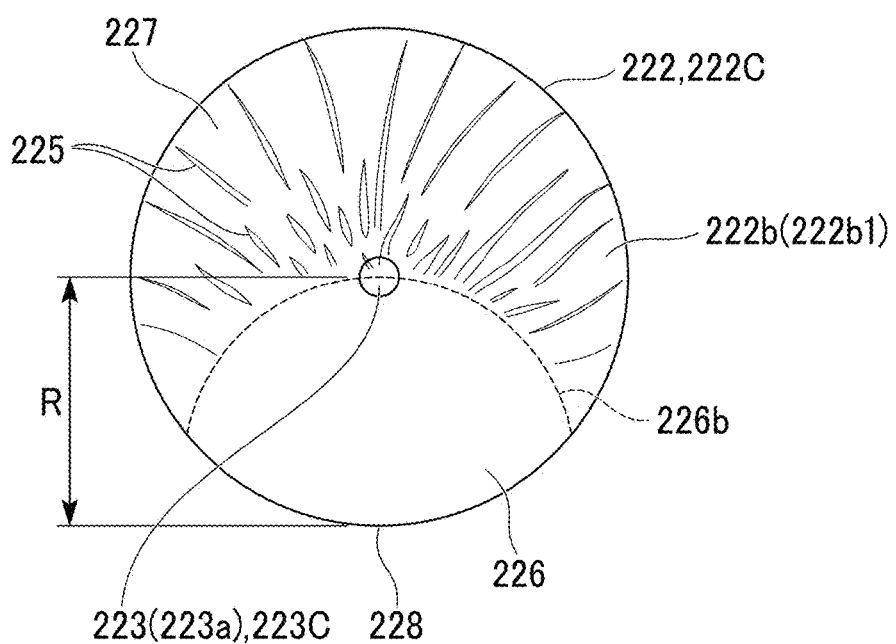
FIG. 19 is a diagram showing another example of the front end face of the inserted optical fiber.

FIG. 19 shows a third example of Case 1. In the inserted optical fiber 222(222C) in this example, a portion of a region of the end face 223a of the core 223 is located in the hackle mark region 227. Therefore, the end face 223a of the core 223(223C) is a non-mirror face, and the core 223 can be regarded as being included in the non-mirror portion.

Similarly to the case of FIGS. 17A and 17B, the end face 222b1 has no protruding portion having a height of 10 μm or greater protruding from the reference surface 224(224A).

In the examples shown in FIGS. 17A to 19, the mirror face region 226 is a region having an approximately arc-shaped circumferential edge 226b centering on the start point 228 of the initial crack or the periphery thereof. A distance from the start point 228 to the circumferential edge 226b (distance of the end face 222b1 in a radial direction) is referred to as a mirror radius R.

It has been reported that there is a relationship shown in Expression (1) and Table 1 between the breaking strength α (g/mm$^2$) of the optical fiber 222 and the mirror radius R (see "Mechanical Strength and Reliability of Optical Fiber" authored by Masahiro Sato, Fujikura Technical Journal, Fujikura Co., Ltd., March 1983, No. 65, p.1 to 8).

$$\alpha = 6800/R^{1/2} \text{ (g/mm}^2\text{)}: \tag{1}$$

TABLE 1

| MIRROR RADIUS R (μm) | $R^{1/2}$ | α (g/mm$^2$) |
|---|---|---|
| 5 | 2.236 | 1183 |
| 10 | 3.162 | 836 |
| 15 | 3.872 | 683 |
| 20 | 4.472 | 591 |
| 25 | 5.000 | 529 |
| 30 | 5.477 | 483 |
| 35 | 5.916 | 447 |
| 40 | 6.324 | 418 |
| ENTIRE SURFACE | 11.180 | 236 |

Based on Expression (1) and Table 1, as the breaking strength becomes larger, the area ratio of the mirror face region 226 becomes smaller, and the area ratio of the hackle mark region 227 becomes larger.

The micro irregularities formed on the end face 222b1 (cutting face) of the inserted optical fiber 222 are not limited to the hackle mark. For example, there are rib marks (for example, Wallner lines or Arrest lines) or the like.

Even in the case of the micro irregularities other than the hackle mark, similarly to the hackle mark, the height (or maximum height Rz) of the protruding portion may be, for example, equal to or greater than 1 μm and less than 10 μm.

As shown in FIG. 16, it is preferable that a distance D1 (hereinafter, referred to as the inter-core distance D1) between the end face 203a of the core 203 of the built-in optical fiber 202 and the end face 223a of the core 223 of the inserted optical fiber 222 be equal to or less than the thickness T1 of the refractive index-matching material layer 210 (thickness of the core 203 on the end face 203a)(see FIG. 15). It is preferable that the inter-core distance D1 be equal to or less than 20 μm.

The inter-core distance D1 is set to be in this range, and thus the refractive index-matching material layer 210 is brought into contact with the end face 223a of the core 223 of the inserted optical fiber 222, thereby allowing the refractive index-matching effect to be reliably obtained.

The inter-core distance is, for example, a distance between the centers of the end faces of cores of two optical fibers.

(Case 2)

Next, Case 2 will be described.

Case 2 is a case where the end face (cutting face) of the inserted optical fiber has the protruding portion, and the protrusion height thereof is equal to or greater than 10 μm and equal to or less than the thickness of the refractive index-matching material layer.

Figure 20:
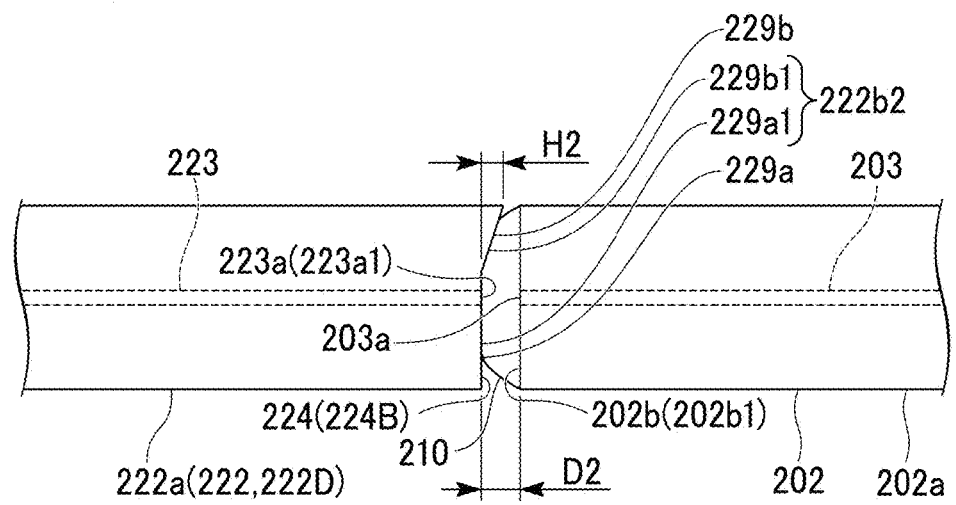
FIG. 20 is a side view showing a connection portion between the built-in optical fiber of FIG. 15 and another example of the inserted optical fiber.

FIG. 20 is a diagram showing a first example of Case 2. In the example shown in FIG. 20, a main portion 229a having a main face 229a1, and a protruding portion 229b protruding the main face 229a1 in a front end direction are formed on an end face 222b2 (front end face) of the inserted optical fiber 222(222D).

The main face 229a1 is an approximately flat face perpendicular to the optical axis of the inserted optical fiber 222, and includes the end face 223a of the core 223. In this example, the main face 229a1 is larger in area than a protruding portion end face 229b1 of the protruding portion 229b.

The protruding portion 229b has the approximately flat protruding portion end face 229b1 inclined with respect to the main face 229a1. The protruding portion end face 229b1 is inclined in a direction in which the height increases as the end face becomes more distant from the core 223.

Since the end face 202b1 is a face perpendicular to the optical axis of the built-in optical fiber 202, and the main face 229a1 is a face perpendicular to the optical axis of the inserted optical fiber 222, the main face 229a1 is parallel to the end face 202b1. In addition, the main face 229a1 includes the center 223a1 of the end face 223a of the core 223.

Thus, the main face 229a1 is a reference surface 224(22B) in the inserted optical fiber 222.

The protruding portion 229b is formed so as to protrude from the main face 229a1 (reference surface 224(224B)) toward the end face 202b1.

The protrusion height H2 of the protruding portion 229b is a height from the main face 229a1, and is the dimension of the inserted optical fiber 222 in an optical axis direction. The height H2 is also referred to as the height of the protruding portion 229b based on the end face 223a (for example, center 223a1) of the core 223.

The height H2 of the protruding portion 229b is set to be equal to or greater than 10 μm and the thickness T1 of the refractive index-matching material layer 210 (thickness of the core 203 on the end face 203a). The height H2 of the protruding portion 229b is, for example, equal to or greater than 10 μm and equal to or less than 20 μm.

The height H2 is set to be in this range, and thus the refractive index-matching material layer 210 is reliably brought into contact with the end face 223a of the core 223 of the inserted optical fiber 222, thereby allowing a refractive index-matching effect to be obtained.

In this example, the end face 223a of the core 223 may be a mirror face, and may be a non-mirror face.

In the example of FIG. 20, the main face 229a1 is a face having a maximum area within the end face 222b2, but the main face 229a1 may not be a face having a maximum area.

In addition, the end face 222b2 shown in FIG. 20 is constituted by the main face 229a1 and the protruding portion end face 229b1, but the end face (cutting face) of the inserted optical fiber may include faces other than the main face and the protruding portion end face.

For example, the end face of the inserted optical fiber may include a main portion having the main face, a protruding portion protruding from the main face in a front end direction, and a recessed portion formed in a concave shape with respect to the main face. In this case, the end face of the inserted optical fiber is constituted by the main face, the protruding portion end face, and a recessed portion end face.

It is preferable that a distance D2 (hereinafter, referred to as the inter-core distance D2) between the end face 203a of the core 203 of the built-in optical fiber 202 and the end face 223a of the core 223 of the inserted optical fiber 222 be equal to or less than the thickness T1 (thickness of the core 203 on the end face 203a) of the refractive index-matching material layer 210. It is preferable that the inter-core distance D2 be equal to or less than 20 μm.

The main face 229a1 shown in FIG. 20 is a face perpendicular to the optical axis of the inserted optical fiber 222, but the main face may be inclined with respect to the vertical face.

Figure 21:
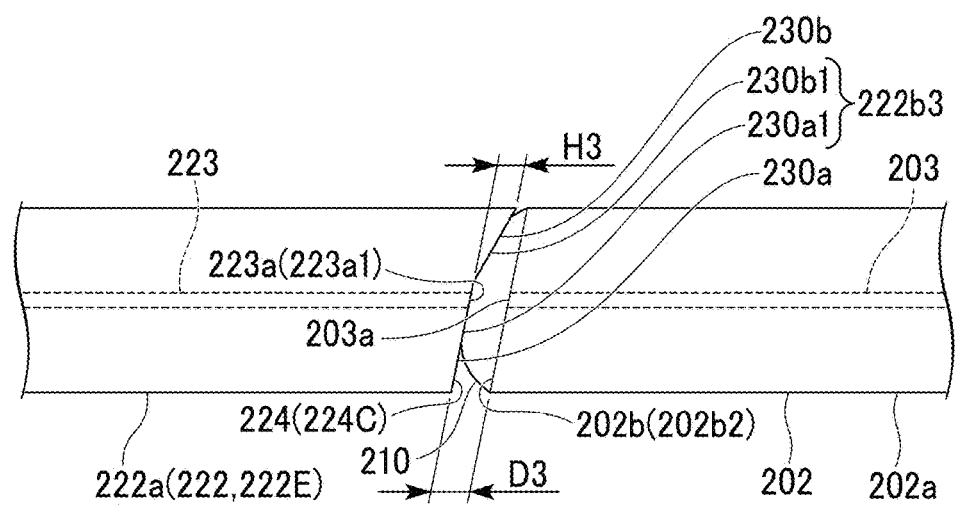
FIG. 21 is a side view showing a connection portion between the built-in optical fiber and another example of the inserted optical fiber.

FIG. 21 shows a diagram showing a second example of Case 2, and shows an example in which the main face is an inclined face.

An end face 202b2 of the built-in optical fiber 202 is an approximately flat face inclined with respect to the face perpendicular to the optical axis of the built-in optical fiber 202.

A main portion 230a having a main face 230a1, and a protruding portion 230b protruding from the main face 230a1 in a front end direction are formed on an end face 222b3 of the inserted optical fiber 222(222E).

The main face 230a1 is an approximately flat face inclined with respect to the face perpendicular to the optical axis of the inserted optical fiber 222, and includes the end face 223a of the core 223. The protruding portion 230b has an approximately flat protruding portion end face 230b1 inclined with respect to the main face 230a1.

The main face 230a1 of the inserted optical fiber 222 is an inclined face parallel to the end face 202b2 of the built-in optical fiber 202, and includes the center 223a1 of the end face 223a of the core 223.

Thus, the main face 230a1 is a reference surface 224 (224C) in the inserted optical fiber 222.

The protruding portion 230b is formed so as to protrude from the main face 230a1 (reference surface 224(224C)) toward the end face 202b2.

The protrusion height H3 of the protruding portion 230b is a height from the main face 230a1, and is a dimension from an optical axis direction. The height 113 is set to be equal to or greater than 10 μm and equal to or less than the thickness T2 (thickness of the core 203 on the end face 203a) of the refractive index-matching material layer 210. It is preferable that the height 113 of the protruding portion 230b be equal to or greater than 10 μm and equal to or less than 20 μm.

The thickness T2 of the refractive index-matching material layer 210 is the dimension of the built-in optical fiber 202 in an optical axis direction.

It is preferable that a distance D3 (hereinafter, referred to as the inter-core distance D3) between the end face 203a of the core 203 of the built-in optical fiber 202 and the end face 223a of the core 223 of the inserted optical fiber 222 be equal to or less than the thickness T2 (thickness of the core 223 on the end face 223a) of the refractive index-matching material layer 210. It is preferable that the inter-core distance D3 be equal to or less than 20 µm.

Even in this example, the end face 223a of the core 223 may be a mirror face, and may be a non-mirror face.

Figure 22A:
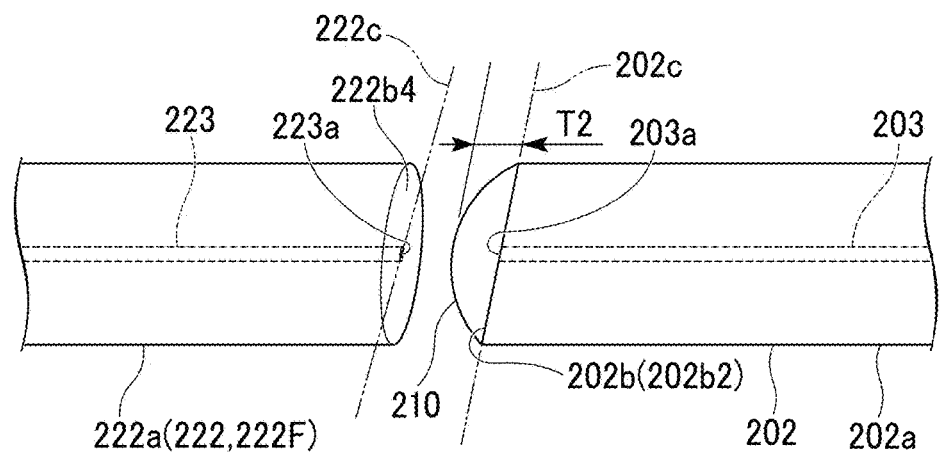
FIG. 22A is a side view showing a built-in optical fiber and an inserted optical fiber.
Figure 22B:
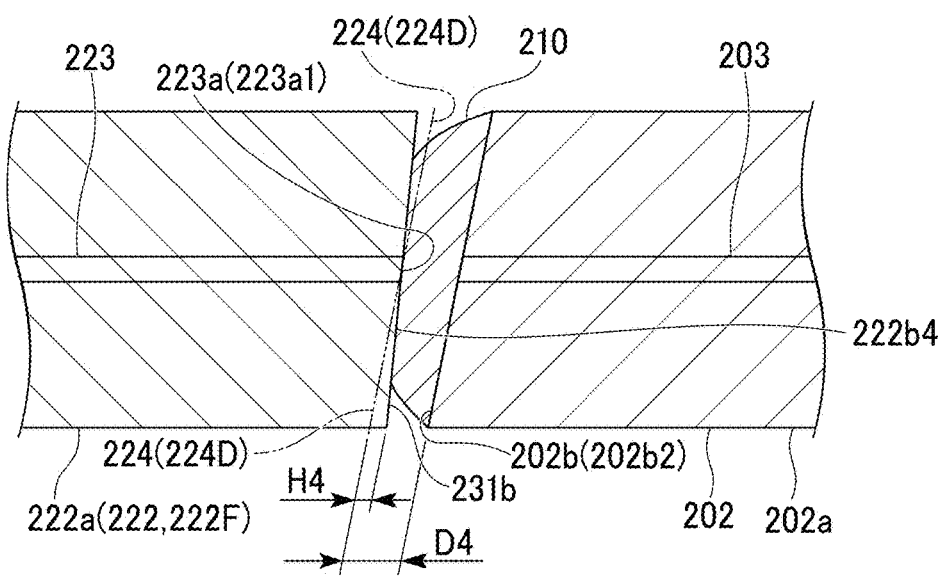
FIG. 22B is a cross-sectional view showing a connection portion between the built-in optical fiber and the inserted optical fiber shown in FIG. 22A.

FIGS. 22A and 22B are diagrams illustrating a third example of Case 2. FIG. 22A is a diagram showing shapes of the inserted optical fiber 222 and the built-in optical fiber 202, and FIG. 22B is a cross-sectional view showing a connection portion between the inserted optical fiber 222 and the built-in optical fiber 202.

Similarly to the second example shown in FIG. 21, the end face 202b2 of the built-in optical fiber 202 is an approximately flat face inclined with respect to the face perpendicular to the optical axis of the built-in optical fiber 202. An end face 222b4 of the inserted optical fiber 222 (222F) is also an approximately flat face inclined with respect to the face perpendicular to the optical axis of the inserted optical fiber 222. The inclination angles of the end face 202b2 and the end face 222b4 are the same as each other.

As shown in FIG. 22A, in this example, since the directions of a main line 202c of the end face 202b2 and a main line 222c of the end face 222b4 are different from each other, the inclination directions of the end face 202b2 and the end face 222b4 are not coincident with each other. The main line refers to, for example, a line passing through the front end and the center of the inclined end face.

As shown in FIG. 22B, a face which is parallel to the end face 202b2 and including the center 223a1 of the end face 223a of the core 223 is set to a reference surface 224(224D).

The end face 222b4 of the inserted optical fiber 222(222F) is an approximately flat face, but a portion of the end face protrudes closer to the built-in optical fiber 202 side than the reference surface 224(224D), due to nonconformity between the inclination directions described above.

In FIG. 22B, a portion located further downward than the end face 223a of the core 223 is a protruding portion 231b protruding from the reference surface 224(224D) toward the end face 202b2.

The protrusion height H4 of the protruding portion 231b is a height from the reference surface 224(224D), and is the dimension of the inserted optical fiber 222 in an optical axis direction. The height H4 is set to be equal to or greater than 10 µm and equal to or less than the thickness T2 of the refractive index-matching material layer 210. It is preferable that the height H4 of the protruding portion 231b be equal to or greater than 10 µm and equal to or less than 20 µm.

It is preferable that a distance D4 (hereinafter, referred to as the inter-core distance D4) between the end face 203a of the core 203 of the built-in optical fiber 202 and the end face 223a of the core 223 of the inserted optical fiber 222 be equal to or less than the thickness T2 (thickness of the core 223 on the end face 223a) of the refractive index-matching material layer 210. It is preferable that the inter-core distance D4 be equal to or less than 20 µm.

(Butting Between Optical Fibers)

As shown in FIG. 25B, the inserted optical fiber 222 protruding from the terminal of the optical fiber cable 221 fed to the alignment groove 219a of the ferrule 212 with a clamp, and the bare optical fiber 222a on the front end of the inserted optical fiber 222 is butt-jointed to the rear end of the built-in optical fiber 202.

As shown in FIG. 26, when the interposition piece 231 is removed from the clamp 214 of the ferrule 212 with a clamp, the bare optical fiber 222a on the front end of the inserted optical fiber 222 is held and fixed between the rear-side extending piece 215 and the lid members 216 and 217 due to the elasticity of the clamp spring 218.

Thereby, it is possible to stably maintain the state of butt connection of the inserted optical fiber 222 to the built-in optical fiber 202 of the ferrule 212 with a clamp.

In Case 1 (see FIGS. 17A to 19), as shown in FIG. 16, the end face 222b1 (front end face) of the front end 222b (connection end) of the inserted optical fiber 222 is butt-jointed to the end face 202b1 (rear end face) of the rear end 202b of the built-in optical fiber 202 through the refractive index-matching material layer 210, and the optical fiber 202 and the optical fiber 222 are optically connected to each other.

The refractive index-matching material layer 210 is compressed and deformed elastically in a thickness direction, and the rear face 210a comes into contact with the end face 222b1 at a central portion 210b.

The rear face 210a of the refractive index-matching material layer 210 in a compressed and deformed state may be formed in a shape having, for example, the circular central portion 210b coming into contact with the end face 222b1 and a circular (annular) circumference portion 210c forming a curved-convex face in the periphery thereof.

In the shown example, the central portion 210b of the refractive index-matching material layer 210 comes into contact with a portion including the end face 223a of the core 223.

In Case 1 (see FIGS. 17A to 19), micro irregularities such as the hackle marks 225 are formed on the end face 223a of the core 223 of the inserted optical fiber 222, but the refractive index-matching material layer 210 is provided on the end face 202b1 of the built-in optical fiber 202, and thus the refractive index-matching material layer 210 can be interposed between the end faces 202b1 and 222b1 of the built-in optical fiber 202 and the inserted optical fiber 222 (particularly, between the end faces 203a and 223a of the cores 203 and 223).

Therefore, even in a case where irregularities are present on the end face 222b1, the refractive index-matching material layer 210 is formed in a shape along the end face, and thus a void does not occur between the end faces 202b1 and 222b1 (particularly, between the end faces 203a and 223a), thereby allowing low-loss optical connection to be realized.

In addition, since the refractive index-matching material layer 210 is solid, unlike a case where a liquid refractive index-matching material is used, a disadvantage does not occur in which a loss increases after the connection of the optical fibers due to the infiltration of air bubbles or foreign substances associated with a flow of the refractive index-matching material under the high-temperature environment.

In addition, since a loss can be suppressed even in a case where irregularities are present on the end face of the inserted optical fiber 222, it is possible to use a low-cost and simple-type optical fiber cutter, which is advantageous in terms of cost.

In Case 2 (see FIGS. 20 to 22B), the protruding portions 229b, 230b, and 231b are formed on the end faces 222b2 to 222b4 of the inserted optical fiber 222, but the refractive index-matching material layer 210 is provided on the end face 202b1 of the built-in optical fiber 202, and thus the refractive index-matching material layer 210 can be interposed between the end faces of the built-in optical fiber 202 and the inserted optical fiber 222 (particularly, between the end faces 203a and 223a of the cores 203 and 223).

Therefore, a void does not occur between the end faces 202b1 and 222b2, and thus it is possible to realize low-loss optical connection.

In addition, since the refractive index-matching material layer 210 is solid, unlike a case where the liquid refractive index-matching material is used, a disadvantage does not occur in which a loss increases after the connection of the optical fibers due to the infiltration of air bubbles or foreign substances associated with a flow of the refractive index-matching material under the high-temperature environment.

Figure 23:
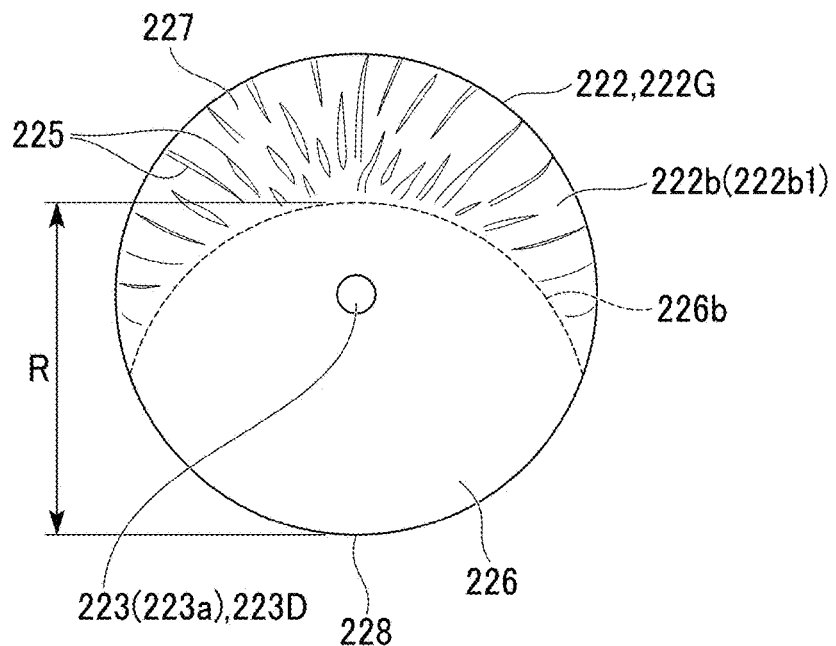
FIG. 23 is a diagram showing another example of the front end face of the inserted optical fiber.
Figure 24:
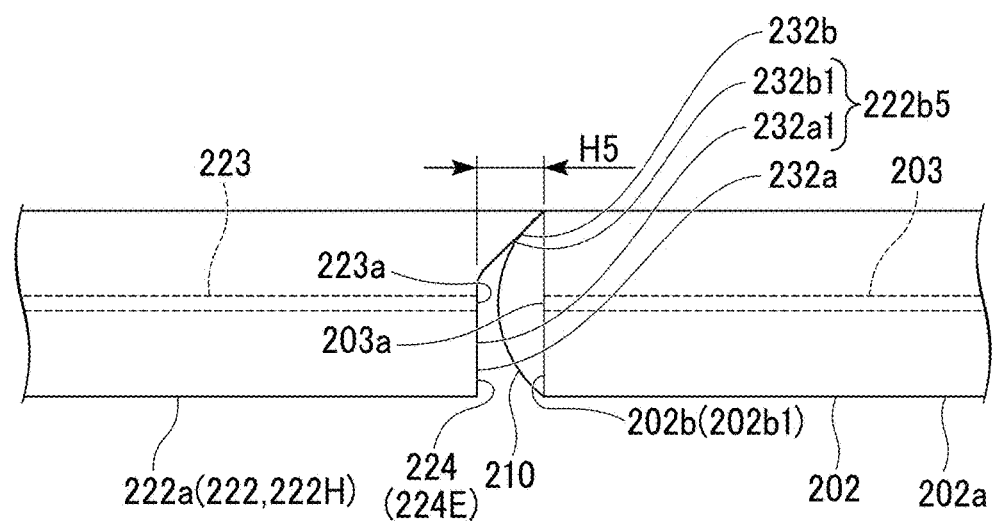
FIG. 24 is a side view showing a connection portion between the built-in optical fiber of FIG. 15 and another example of the inserted optical fiber.

FIGS. 23 and 24 are diagrams illustrating a case out of a target for the connection method of the invention.

FIG. 23 shows a first example of the case out of a target. In the inserted optical fiber 222(222G) in this example, the mirror face region 226 is wider than in the case of FIGS. 17A and 17B, and the entirety of the end face 223a of the core 223(223D) is located within the mirror face region 226.

Since the end face 223a of the core 223(223D) is a mirror face, the end face 222b1 in this example does not fall under Case 1.

In addition, the end face 222b1 is an approximately flat face, has no protruding portion having a height of 10 μm or greater, and thus also does not fall under Case 2.

Thus, the end face 222b1 of the inserted optical fiber 222 in this example is out of a target for the connection method of the invention.

FIG. 24 shows a second example of the case out of a target. In this example, a main portion 232a having a main face 232a1 (reference surface 224(224E)) and a protruding portion 232b protruding from the main face 232a1 are formed on an end face 222b5 of the inserted optical fiber 222(222H). The protruding portion 232b has a protruding portion end face 232b1 inclined with respect to the main face 232a1.

The protrusion height H5 of the protruding portion 232b with respect to the main face 232a1 (reference surface 224(224E)) is larger than the thickness T1 of the refractive index-matching material layer 210.

The present example includes both a case where the end face 223a of the core 223 is a mirror face and a case where the end face thereof is a non-mirror face.

Since the protrusion height H5 of the protruding portion 232b with respect to the main face 232a1 exceeds the thickness T1 of the refractive index-matching material layer 210, this example falls under neither Case 1 nor Case 2.

Thus, the end face 222b5 of the inserted optical fiber 222 shown in FIG. 24 is out of a target for the connection method of the invention.

As shown in FIG. 24, since the protruding portion 232b of the end face 222b5 in this example is formed to be high, the protruding portion 232b comes into contact with the end face 202b1 of the built-in optical fiber 202. Since the height H5 of the protruding portion 232b is larger than the thickness T1 of the refractive index-matching material layer 210, the refractive index-matching material layer 210 does not reach the end face 223a of the core 223, and thus a refractive index-matching effect is not obtained.

Figure 27A:
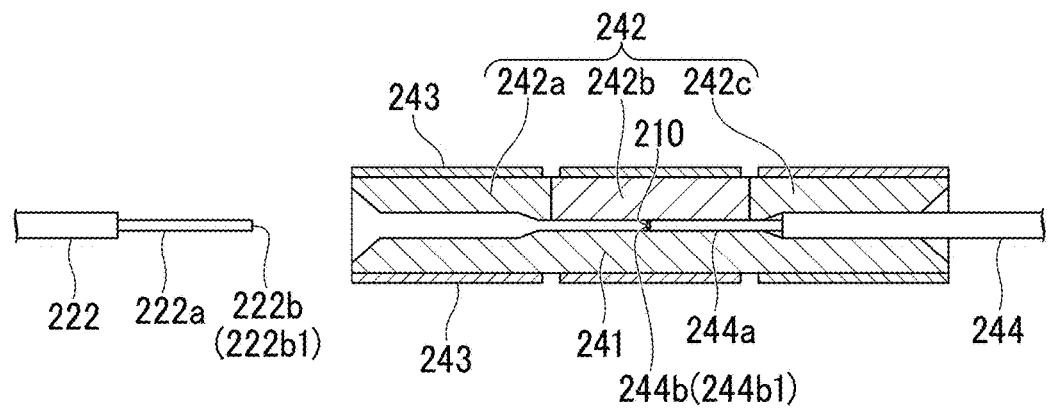
FIG. 27A is a cross-sectional view showing a mechanical splice capable of applying the connection method according to the second embodiment of the invention.
Figure 27B:
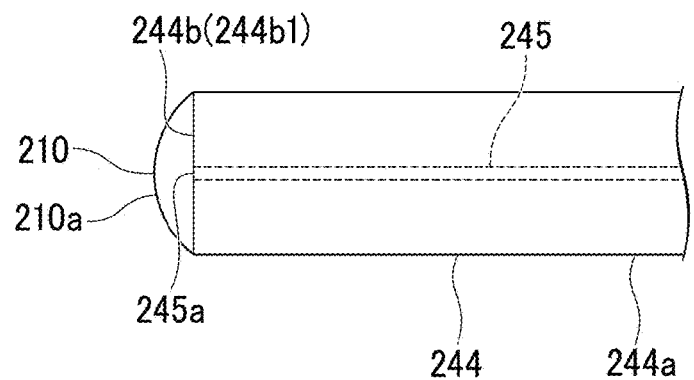
FIG. 27B is a side view showing an end of a receiving-side optical fiber.

As shown in FIGS. 27A and 27B, the connection method of the invention can also be applied to a mechanical splice (optical fiber connector) without being limited to the optical connector.

Hereinafter, the structure of a mechanical splice 240 is described, and then a method of connecting the optical fibers using this mechanical splice will be described. Common portions with respect to those in the aforementioned method of connecting the optical connector 220 are denoted by the same reference numerals and signs, and thus the description thereof will not be given.

As shown in FIG. 27A, the mechanical splice 240 includes a base member 241 (base-side element), a lid member 242 (242a, 242b, 242c) (cover-side element), and a clamp spring 243 for collectively holding these members.

The mechanical splice 240 can interpose and hold a receiving-side optical fiber 244 and the inserted optical fiber 222 between the base member 241 and the lid member 242.

As shown in FIG. 27B, similarly to the built-in optical fiber 202 shown in FIG. 15, the receiving-side optical fiber 244 has the solid refractive index-matching material layer 210 formed in an end face 244b1 of a front end 244b of a lead-out bare optical fiber 244a. Reference numeral 245 indicates a core, and reference numeral 245a indicates the end face of the core 245.

(Insertion of Receiving-side Optical Fiber)

The receiving-side optical fiber 244 is inserted between the base member 241 and the lid member 242 from one end side of the mechanical splice 240. Thereby, the receiving-side optical fiber 244 is inserted into the mechanical splice 240.

(Cutting of Inserted Optical Fiber)

After an initial crack is formed in the optical fiber 222 by a cutting blade, a force in a tension direction is given to the inserted optical fiber 222 so as to grow this initial crack, and thus the inserted optical fiber 222 is cut off by a cleavage.

As a cutting tool (optical fiber cutter) of the optical fiber, the aforementioned simple-type cutter can be used.

Next, the inserted optical fiber 222 is fed between the base member 241 and the lid member 242 from the other end side of the mechanical splice 240, and the front end 222b of the bare optical fiber 222a is butt-jointed to the end face 244b1 of the front end 244b (connection end) of the receiving-side optical fiber 244.

In the mechanical splice 240, a case where the cutting face (front end face) of the inserted optical fiber 222 falls under any of Case 1 and Case 2 described above becomes a target.

In a case where the end face 222b1 of the inserted optical fiber 222 falls under Case 1 (see FIGS. 17A to 19), micro irregularities such as the hackle marks 225 are formed on the end face 223a of the core 223 of the inserted optical fiber 222, but the refractive index-matching material layer 210 is formed in a shape along the end face. Therefore, a void does not occur between the end faces 244b1 and 222b1 (particularly, between the end faces 245a and 223a), and thus it is possible to realize low-loss optical connection.

In Case 2 (see FIGS. 20 to 22B), the protruding portions 229b, 230b, and 231b are formed on the end face 222b2 to 222b4 of the inserted optical fiber 222, but the refractive index-matching material layer 210 is provided on the end face 202b1 of the built-in optical fiber 202, and thus the refractive index-matching material layer 210 can be interposed between the end faces 244b1 and 222b1 (particularly, between the end faces 245a and 223a).

Therefore, a void does not occur between the end faces 244b1 and 222b2, and thus it is possible to realize low-loss optical connection.

While the preferred embodiments of the invention have been described and illustrated above, these embodiments are merely exemplary of the invention, and it should be understood that the embodiments are not to be considered as limiting the invention. Additions, omissions, substitutions, and other changes can be made without departing from the spirit or scope of the invention. Therefore, the invention should not be construed to be limited to the aforementioned description, and is only limited by the scope of the appended claims.

DESCRIPTION OF REFERENCE NUMERAL

1: first optical fiber (built-in optical fiber), 1a: second end, 1b, 202b1, 222b1, 222b2, 223a: end face, 1c: first end, 1d: end face (front end face), 2: second optical fiber (inserted optical fiber), 2a: bare optical fiber, 2c: end face (front end face), 3: adhesive, 3A: swelling portion, 10, 210: refractive index-matching material layer, 11: optical fiber holder, 12: guide member, 12B: slide face. 12F: lower surface, 13: press member. 13B: press piece, 14: first holding member, 14c: first holding surface, 14d, 15d: recessed portion, 15: second holding member, 15c: second holding surface, 15e, 15f: pressed face, 15h: V-groove formation face, 15i: V-groove, 16A, 224: reference surface, 16: optical fiber holding portion (holding portion), 18: protective space, 31: optical fiber cable, 57: connection portion, 58: second interposition element, 59: ferrule structure, 60: ferrule with a clamp, 61: ferrule, 61a: fiber hole, 61b: front end face (front end), 61d: rear end, 63: clamp, 65: base member (first interposition element), 69a: alignment groove, 70: ferrule-holding jig, 71: slider, 73: optical fiber insertion device (insertion device), 74: forward-movement limiter, 110: exploded optical connector. 202: built-in optical fiber (receiving-side optical fiber), 202b: rear end (connection end), 220: optical connector (optical fiber connector), 222: inserted optical fiber (external optical fiber), 222b: front end (connection end), 223: core, 223a1: center, 227: hackle mark region (non-mirror portion), 229b, 230b, 231b: protruding portion, 240: mechanical splice (optical fiber connector), 244: receiving-side optical fiber, 244b: front end (connection end), 244b1: end face, H, K: distance, θ: elevation angle

The invention claimed is:

1. A method of manufacturing an optical connector, the optical connector comprising a ferrule and a first optical fiber, the first optical fiber comprising a first end and a second end, wherein the ferrule is attached to the first end and a solid refractive index-matching material layer is formed on an end face of the second end, the method comprising: holding the second end of the first optical fiber from both sides thereof in a radial direction by a pair of holding members of an optical fiber holder at a position apart from the end face of the second end; sliding, at an acute angle with respect to an axial direction of a fiber hole of the ferrule, the optical fiber holder by a slider toward the fiber hole of the ferrule and thereby inserting the first optical fiber held by the pair of holding members into the fiber hole of the ferrule from the first end of the first optical fiber, wherein the second end is opposed to the first end, the fiber hole comprises a taper portion, and the inside diameter of the fiber hole in the taper portion widens monotonically as the fiber hole approaches a rear end of the ferrule.

2. The method of manufacturing an optical connector according to claim 1, wherein the first optical fiber is held by the pair of holding members from a direction orthogonal to a plane which is formed by a direction in which the optical fiber holder slides by the slider and the axial direction of the fiber hole.

3. The method of manufacturing an optical connector according to claim 2, wherein
a connection mechanism that holds a connection portion butt-jointing the first optical fiber protruding from a rear of the ferrule and a second optical fiber is provided at a rear side of the ferrule,
the connection mechanism includes: a base member extending from the ferrule to the rear; and a lid member that interposes the connection portion between the base member and the lid member,
an alignment groove that is used to align the first optical fiber and the second optical fiber is formed in the base member,
when the first optical fiber is inserted into the fiber hole, the first optical fiber is held by the optical fiber holder so as to be inclined in the axial direction of the fiber hole, and
when the first optical fiber moves forward, the first optical fiber is introduced into an inlet portion of the fiber hole by being curved by bringing the first optical fiber into contact with the alignment groove.

4. The method of manufacturing an optical connector according to claim 3, wherein
the slider includes a forward-movement limiter that determines a forward-movement limit of the optical fiber holder, and
the second end of the first optical fiber is positioned in the alignment groove by releasing the holding of the optical fiber holder at the forward-movement limit determined by the forward-movement limiter.

5. The method of manufacturing an optical connector according to claim 4, further comprising:
filling the fiber hole with an adhesive in advance;
inserting the first optical fiber into the fiber hole, thereby forming, on the front end of the ferrule, a swelling portion at which an adhesive overflows from the fiber hole; and
determining a length of the first optical fiber so that the first end is contained in the swelling portion.

6. The method of manufacturing an optical connector according to claim 1, wherein the optical fiber holder includes a first holding surface and a second holding surface which interpose and hold the first optical fiber, and on each of the first holding surface and the second holding surface, a recessed portion is formed that constitutes a protective space having the end face of the second end of the first optical fiber which are received therein.

7. The method of manufacturing an optical connector according to claim 1, wherein
the first optical fiber of which the refractive index-matching material layer has a thickness larger than 10 μm is butt-connected to the second optical fiber falling under any of the following conditions with the refractive index-matching material layer interposed therebetween:
(1) a protrusion height of a protruding portion protruding from a reference surface toward the first optical fiber is less than 10 μm, and the core is included in a non-mirror portion, where the reference surface is a face that includes a core and is parallel to an end face of a connection end of the first optical fiber; and
(2) the protrusion height of the protruding potion is equal to or greater than 10 μm and equal to or less than a thickness of the refractive index-matching material layer.

8. The method of manufacturing an optical connector according to claim 7, wherein
an end face of a connection end of the second optical fiber is cut off by a simplified optical fiber cutter that manually performs driving of a cutting blade or application of a tensile force to the second optical fiber.

9. The method of manufacturing an optical connector according to claim 7, wherein an end face of a core of the second optical fiber which is the non-mirror face has hackle marks formed on at least a portion thereof.

10. The method of manufacturing an optical connector according to claim 1, wherein a Shore hardness E and a thickness of the refractive index-matching material layer are in a range surrounded by (Shore hardness E; 30, thickness; 20 μm), (Shore hardness E; 85, thickness; 20 μm), (Shore hardness E; 85, thickness; 40 μm), and (Shore hardness E; 30, thickness; 60 μm).

11. The method of manufacturing an optical connector according to claim 10, wherein a holey fiber is used as the first optical fiber, and
the Shore hardness E of the refractive index-matching material layer is in a range of equal to or greater than 45 and equal to or less than 80.

12. The method of manufacturing an optical connector according to claim 1, wherein the refractive index-matching material layer is formed in a curved-convex shape.

13. An optical connector manufactured by the manufacturing method according to claim 1, wherein the refractive index-matching material layer is bonded to the entire end face of the second end of the first optical fiber.

14. The method of manufacturing an optical connector according to claim 1, wherein inserting the first optical fiber comprises introducing the first end of the first optical fiber into the fiber hole via the taper portion.

15. The method of manufacturing an optical connector according to claim 1, wherein the monotonic widening of the fiber hole in the taper portion comprises a funnel shape.

16. A method of manufacturing an optical connector, the optical connector comprising a ferrule and a first optical fiber that has a first end where the ferrule is attached and a second end opposed to the first end where a solid refractive index-matching material layer is formed on an end face of the second end, the method comprising:

holding the second end of the first optical fiber from both sides thereof in a radial direction by a pair of holding members of an optical fiber holder at a position apart from the end face of the second end;
filling a fiber hole of the ferrule with an adhesive;
inserting, after filling the fiber hole with the adhesive, the first optical fiber held by the pair of holding members into the fiber hole from the first end of the first optical fiber, thereby forming, on the front end of the ferrule, a swelling portion at which an adhesive overflows from the fiber hole; and
determining a length of the first optical fiber so that the first end is contained in the swelling portion.

* * * * *